United States Patent
Widmer

(10) Patent No.: US 10,564,307 B2
(45) Date of Patent: Feb. 18, 2020

(54) SYSTEMS, METHODS, AND APPARATUS FOR FOREIGN OBJECT DETECTION LOOP BASED ON INDUCTIVE THERMAL SENSING

(71) Applicant: WiTricity Corporation, Watertown, MA (US)

(72) Inventor: Hanspeter Widmer, Wohlenschwil (CH)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 16/414,638

(22) Filed: May 16, 2019

(65) Prior Publication Data
US 2019/0271791 A1    Sep. 5, 2019

Related U.S. Application Data

(63) Continuation of application No. 14/279,112, filed on May 15, 2014, now Pat. No. 10,295,693.

(51) Int. Cl.
*G01V 3/10*    (2006.01)

(52) U.S. Cl.
CPC ............... *G01V 3/10* (2013.01); *G01V 3/101* (2013.01)

(58) Field of Classification Search
CPC . G01V 3/10; G01V 3/101; H02J 7/025; H02J 5/005; H02J 17/00; H02J 2007/0001; H02J 50/60; H02J 7/0027; H02J 7/0029; H02J 7/0036; H02J 7/045; H02J 50/12; H02J 50/90; B60L 11/182; H04B 5/0037
See application file for complete search history.

(56) References Cited

U.S. PATENT DOCUMENTS

| | | |
|---|---|---|
| 3,018,395 A | 1/1962 | Carlstein |
| 5,519,317 A | 5/1996 | Guichard et al. |
| 5,952,139 A | 9/1999 | Takeuchi et al. |
| 6,216,540 B1 | 4/2001 | Nelson et al. |

(Continued)

FOREIGN PATENT DOCUMENTS

| | | |
|---|---|---|
| CA | 2766854 A1 | 1/2011 |
| CN | 102439669 A | 5/2012 |

(Continued)

OTHER PUBLICATIONS

Kesler, Highly Resonant Wireless Power Transfer: Safe, Efficient, and over Distance, WiTricity Corporation 2013, available online at http://witricity.com/assets/highly-resonant-power-transfer-kesler-witricity-2013.pdf in 32 pages.

(Continued)

*Primary Examiner* — Daniel R Miller
(74) *Attorney, Agent, or Firm* — Knobbe, Martens, Olson & Bear, LLP

(57) ABSTRACT

This disclosure provides systems, methods and apparatus for detecting foreign objects. An apparatus for detecting a presence of an object is provided. The apparatus includes a coil configured to inductively sense a presence of an object based on an electrical characteristic of the coil that varies as a function of a temperature of the object when the object is exposed to an alternating magnetic field. The apparatus further includes a controller configured to detect a change in the electrical characteristic.

23 Claims, 13 Drawing Sheets

(56) References Cited

U.S. PATENT DOCUMENTS

| | | | |
|---|---|---|---|
| 6,864,108 B1 | 3/2005 | Papa Rao et al. | |
| 7,705,589 B2 | 4/2010 | Kim et al. | |
| 7,994,778 B2 | 8/2011 | Kirchdoerffer et al. | |
| 8,193,806 B2 | 6/2012 | Yamaguchi et al. | |
| 8,618,794 B2 | 12/2013 | Ask et al. | |
| 2007/0164735 A1 | 7/2007 | Bowlds | |
| 2008/0164839 A1* | 7/2008 | Kato | H02J 7/025 320/108 |
| 2009/0261778 A1 | 10/2009 | Kook | |
| 2010/0060270 A1 | 3/2010 | Gong et al. | |
| 2010/0134096 A1 | 6/2010 | Chiba et al. | |
| 2010/0259217 A1 | 10/2010 | Baarman et al. | |
| 2010/0277121 A1 | 11/2010 | Hall et al. | |
| 2011/0128015 A1 | 6/2011 | Dorairaj et al. | |
| 2011/0251809 A1 | 10/2011 | Stollenwerk | |
| 2012/0011534 A1 | 1/2012 | Mukerji et al. | |
| 2012/0112534 A1 | 5/2012 | Kesler et al. | |
| 2012/0112691 A1 | 5/2012 | Kurs et al. | |
| 2012/0119576 A1 | 5/2012 | Kesler et al. | |
| 2012/0146580 A1 | 6/2012 | Kitamura | |
| 2012/0161696 A1* | 6/2012 | Cook | B60L 11/182 320/108 |
| 2012/0175967 A1 | 7/2012 | Dibben et al. | |
| 2012/0176085 A1 | 7/2012 | Iida et al. | |
| 2012/0181875 A1 | 7/2012 | Wechlin et al. | |
| 2012/0187757 A1 | 7/2012 | Wechlin et al. | |
| 2012/0206138 A1 | 8/2012 | Derungs | |
| 2013/0099592 A1 | 4/2013 | Abe | |
| 2013/0169062 A1 | 7/2013 | Maikawa et al. | |
| 2013/0181724 A1 | 7/2013 | Teggatz et al. | |
| 2013/0193771 A1 | 8/2013 | Teggatz | |
| 2013/0249682 A1 | 9/2013 | Van Wiemeersch et al. | |
| 2013/0264887 A1 | 10/2013 | Arisawa | |
| 2013/0289662 A1* | 10/2013 | Olson | A61N 1/3787 607/61 |
| 2014/0015329 A1 | 1/2014 | Widmer et al. | |
| 2014/0015522 A1 | 1/2014 | Widmer et al. | |
| 2014/0111019 A1 | 4/2014 | Roy et al. | |
| 2014/0167704 A1 | 6/2014 | Lafontaine et al. | |
| 2014/0247040 A1 | 9/2014 | Reitsma et al. | |
| 2015/0109000 A1 | 4/2015 | Sieber et al. | |
| 2016/0172891 A1 | 6/2016 | Filippenko et al. | |
| 2016/0187519 A1 | 6/2016 | Widmer et al. | |
| 2016/0187520 A1 | 6/2016 | Widmer et al. | |

FOREIGN PATENT DOCUMENTS

| | | |
|---|---|---|
| CN | 102694423 A | 9/2012 |
| CN | 102804541 A | 11/2012 |
| CN | 103053093 A | 4/2013 |
| CN | 103199632 A | 7/2013 |
| CN | 103308949 A | 9/2013 |
| EP | 0782012 A2 | 7/1997 |
| EP | 2378316 A1 | 10/2011 |
| GB | 2025630 A | 1/1980 |
| JP | S56154687 A | 11/1981 |
| JP | S57113362 A | 7/1982 |
| JP | S61-250920 A | 11/1986 |
| JP | H03194818 A | 8/1991 |
| JP | H0821880 A | 1/1996 |
| JP | 1997-030076 A | 2/1997 |
| JP | 2004184257 A | 7/2004 |
| JP | 2004191223 A | 7/2004 |
| JP | 2007-199060 A | 8/2007 |
| JP | 2008232999 A | 10/2008 |
| JP | 2009229261 A | 10/2009 |
| JP | 2010181300 A | 8/2010 |
| JP | 2012523814 A | 10/2012 |
| JP | 2012533277 A | 12/2012 |
| JP | 2013208012 A | 10/2013 |
| WO | WO-2011006758 A2 | 1/2011 |
| WO | WO 2012/165244 A1 | 12/2012 |
| WO | WO-2013127445 A1 | 9/2013 |
| WO | WO-2014095722 A2 | 6/2014 |

OTHER PUBLICATIONS

Serway et al., "Physics for Scientists and Engineers", vol. 2, chapters 23-46, Seventh Edition, Thompson Learning, Inc. 2008, p. 884.

International Search Report and Written Opinion—PCT/US2015/030148—ISA/EPO—dated Sep. 9, 2015.

* cited by examiner

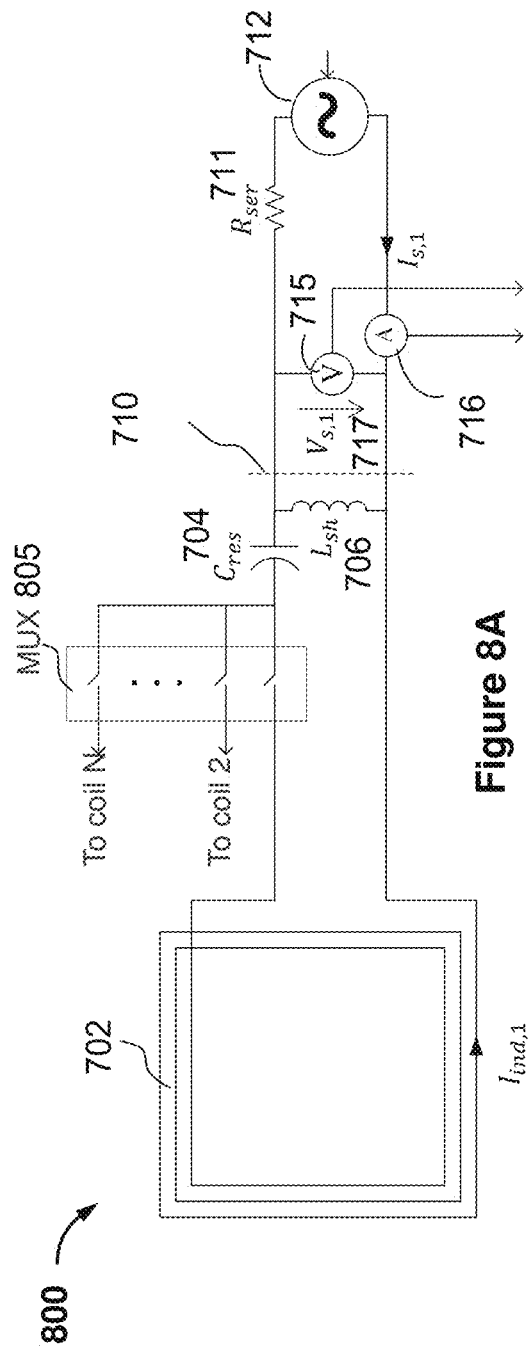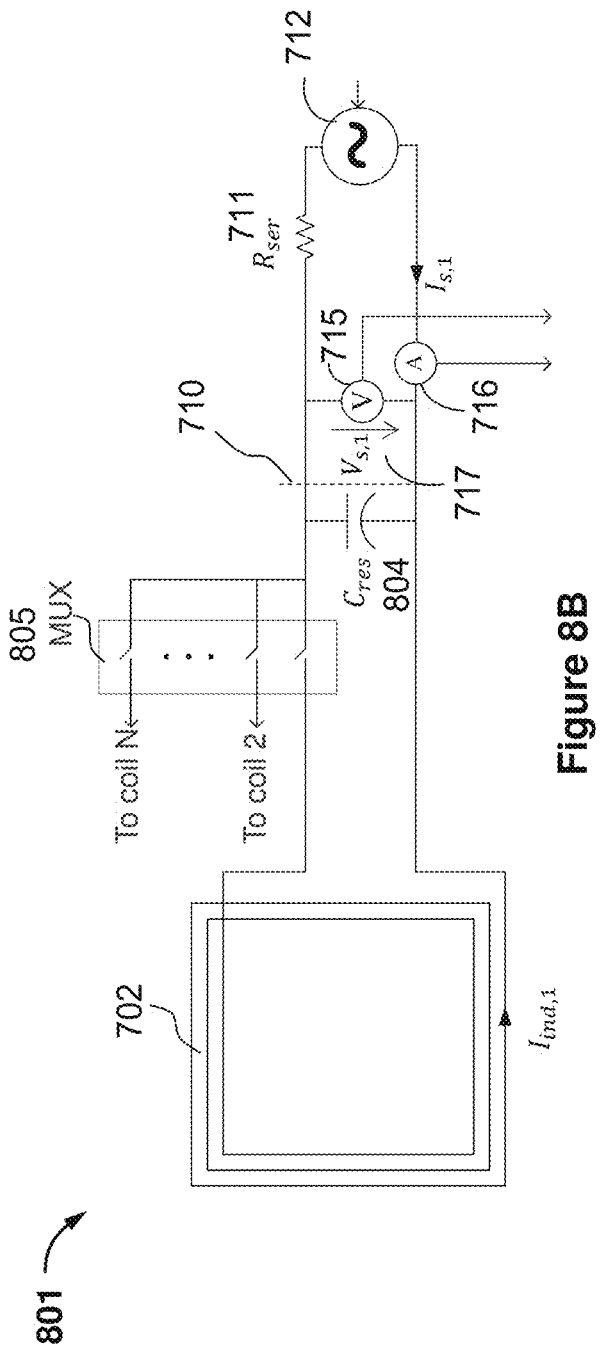
Figure 8A
Figure 8B

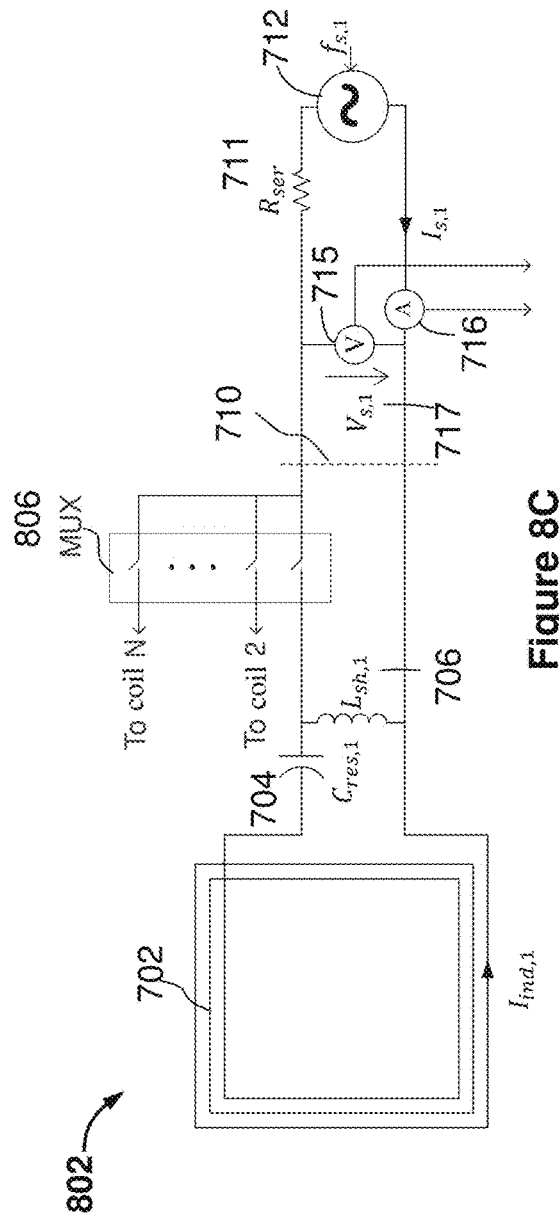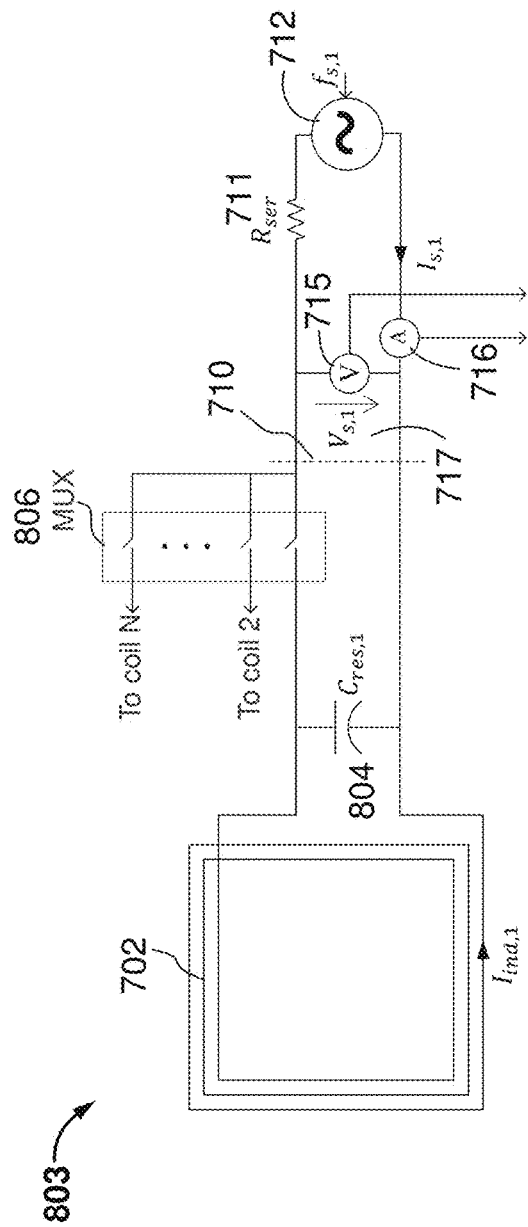
Figure 8C
Figure 8D

SYSTEMS, METHODS, AND APPARATUS FOR FOREIGN OBJECT DETECTION LOOP BASED ON INDUCTIVE THERMAL SENSING

CROSS-REFERENCE TO RELATED APPLICATIONS

This application is a continuation of application Ser. No. 14/279,112, entitled, "SYSTEMS, METHODS, AND APPARATUS FOR FOREIGN OBJECT DETECTION LOOP BASED ON INDUCTIVE THERMAL SENSING" filed May 15, 2014, the disclosure of which is hereby expressly incorporated in its entirety by reference herein.

FIELD

The present disclosure relates generally to wireless power transfer, and more specifically to devices, systems, and methods for enhanced foreign object detection in a predetermined space using inductive-thermal sensing.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via an electromagnetic field) to be used to charge electric vehicles may overcome some of the deficiencies of wired charging solutions. However, using electromagnetic fields may induce eddy currents in a well conducting (e.g., metallic) object located within the field, potentially causing the object to heat up, vibrate or cause a nearby object to melt or catch fire. As such, wireless charging systems and methods that efficiently and safely transfer power for charging electric vehicles are desirable.

SUMMARY

Various embodiments of systems, methods and devices within the scope of the appended claims each have several aspects, no single one of which is solely responsible for the desirable attributes described herein. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn scale.

One aspect of the disclosure provides an apparatus for detecting an object. The apparatus comprises a coil configured to inductively sense a presence of the object based on an electrical characteristic of the coil that varies as a function of a temperature of the object when the object is exposed to an alternating magnetic field. The apparatus further comprises a controller configured to detect a change in the electrical characteristic.

Another aspect of the disclosure provides an embodiment of a method for detecting a presence of an object. The method comprises sensing a presence of the object based on an electrical characteristic of the coil that varies as a function of a temperature of the object when the object is exposed to an alternating magnetic field. The method further comprises detecting a change in an electrical characteristic.

Yet another aspect of the disclosure provides an apparatus for detecting a presence of an object. The apparatus comprises means for sensing a presence of the object based on an electrical characteristic of the coil that varies as a function of a temperature of the object when the object is exposed to an alternating magnetic field. The apparatus further comprises means for detecting a change in an electrical characteristic.

BRIEF DESCRIPTION OF THE DRAWINGS

FIG. 8A is a diagram of a sense circuit in a series tuned configuration using a multiplexer switch inserted between a plurality of sense coils and a common capacitor.

FIG. 8B is a diagram of a sense circuit in a parallel tuned configuration using a multiplexer switch inserted between a plurality of sense coils and a common capacitor.

FIG. 8C is a diagram of a sense circuit in a series tuned configuration using a multiplexer switch inserted between a plurality of capacitors and inductors and a common voltage/current transducer.

FIG. 8D is a diagram of a sense circuit in a parallel tuned configuration using a multiplexer switch inserted between a plurality of capacitors and a common voltage/current transducer.

Figure 1:
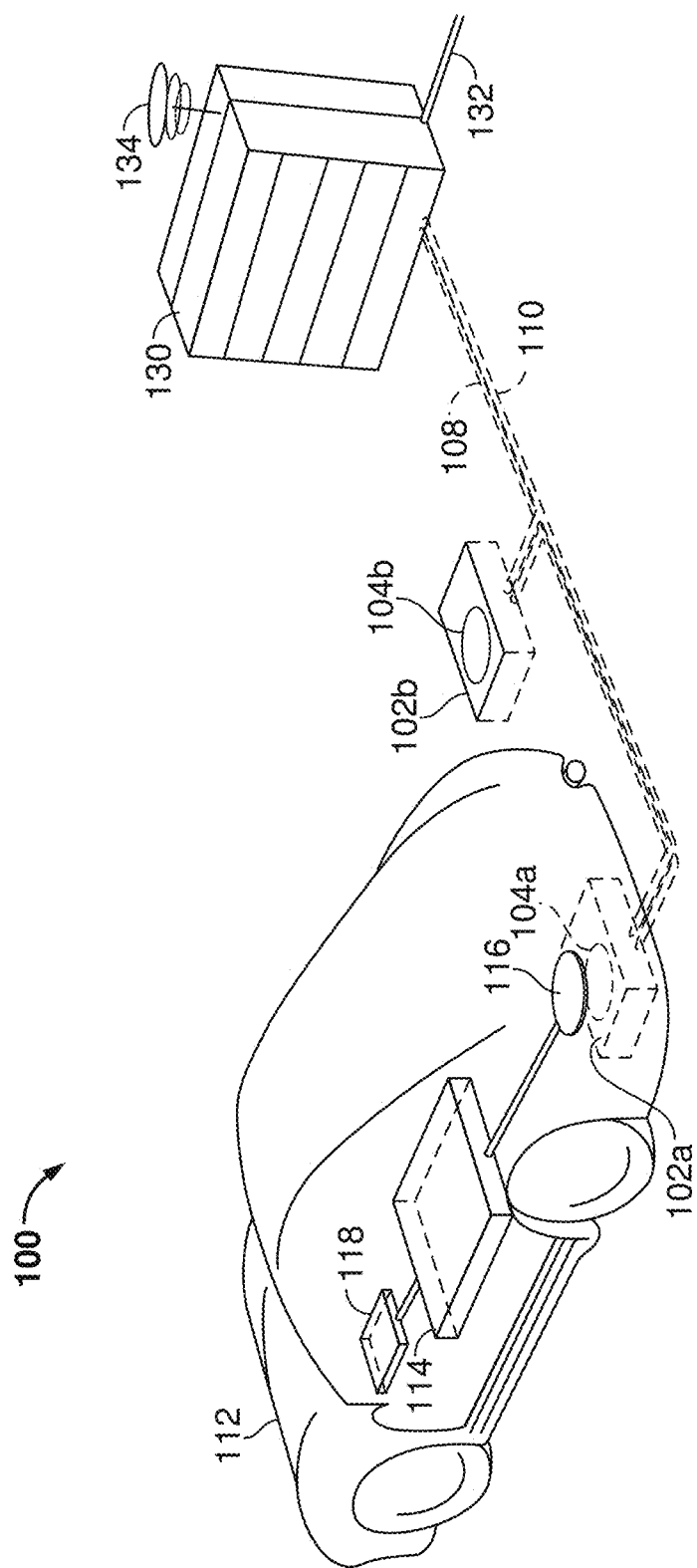
FIG. 1 is a diagram of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into an electro-magnetic field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $\frac{1}{2}\pi$ of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a, e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
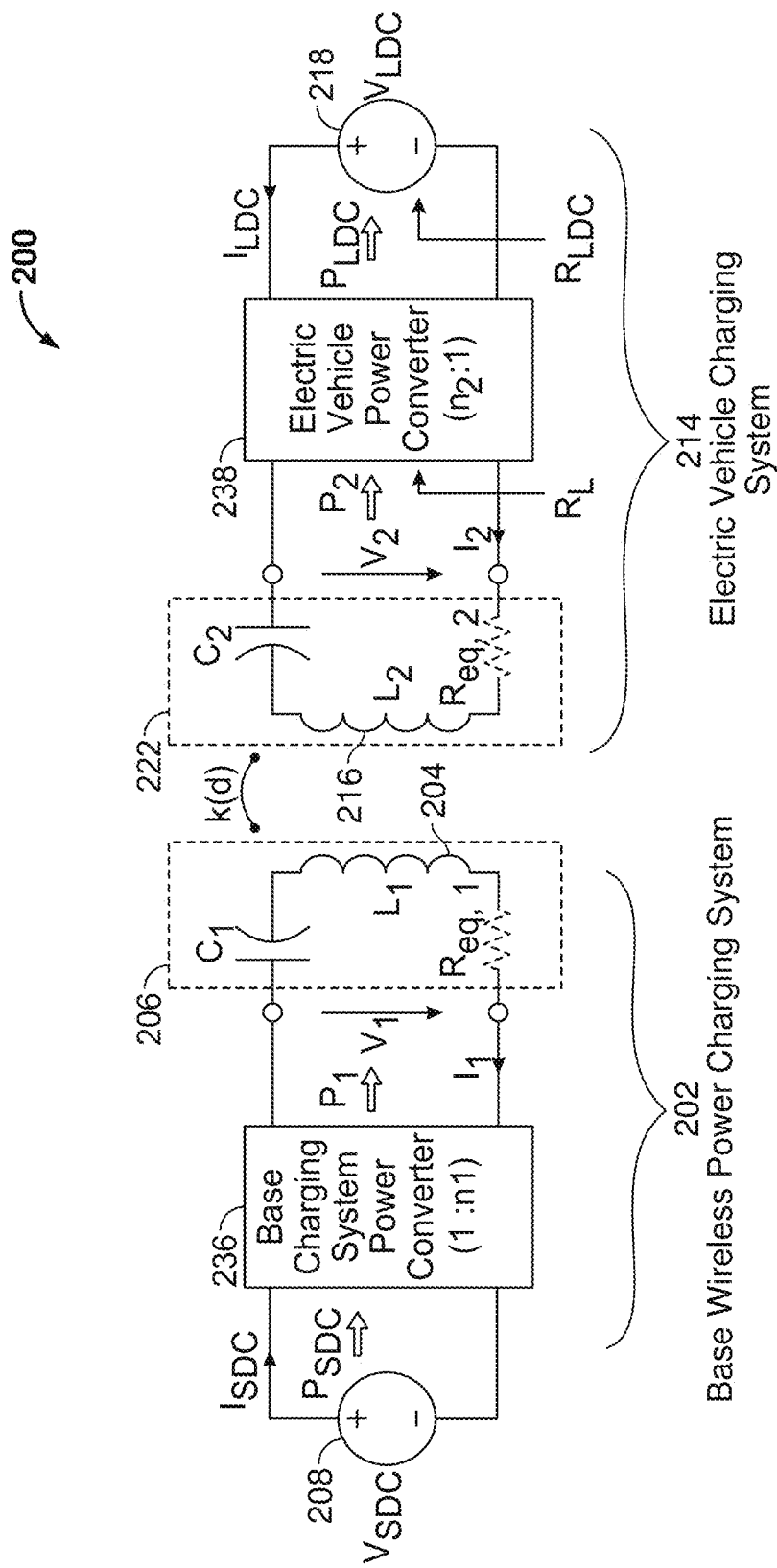
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power PSDC to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be coupled with the base system induction coil 204 either in parallel or in series, or may be formed of several reactive elements in any combination of parallel or series topology. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. The capacitor $C_2$ may be coupled with the electric vehicle induction coil 204 either in parallel or in series, or may be formed of several reactive elements in any combination of parallel or series topology. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
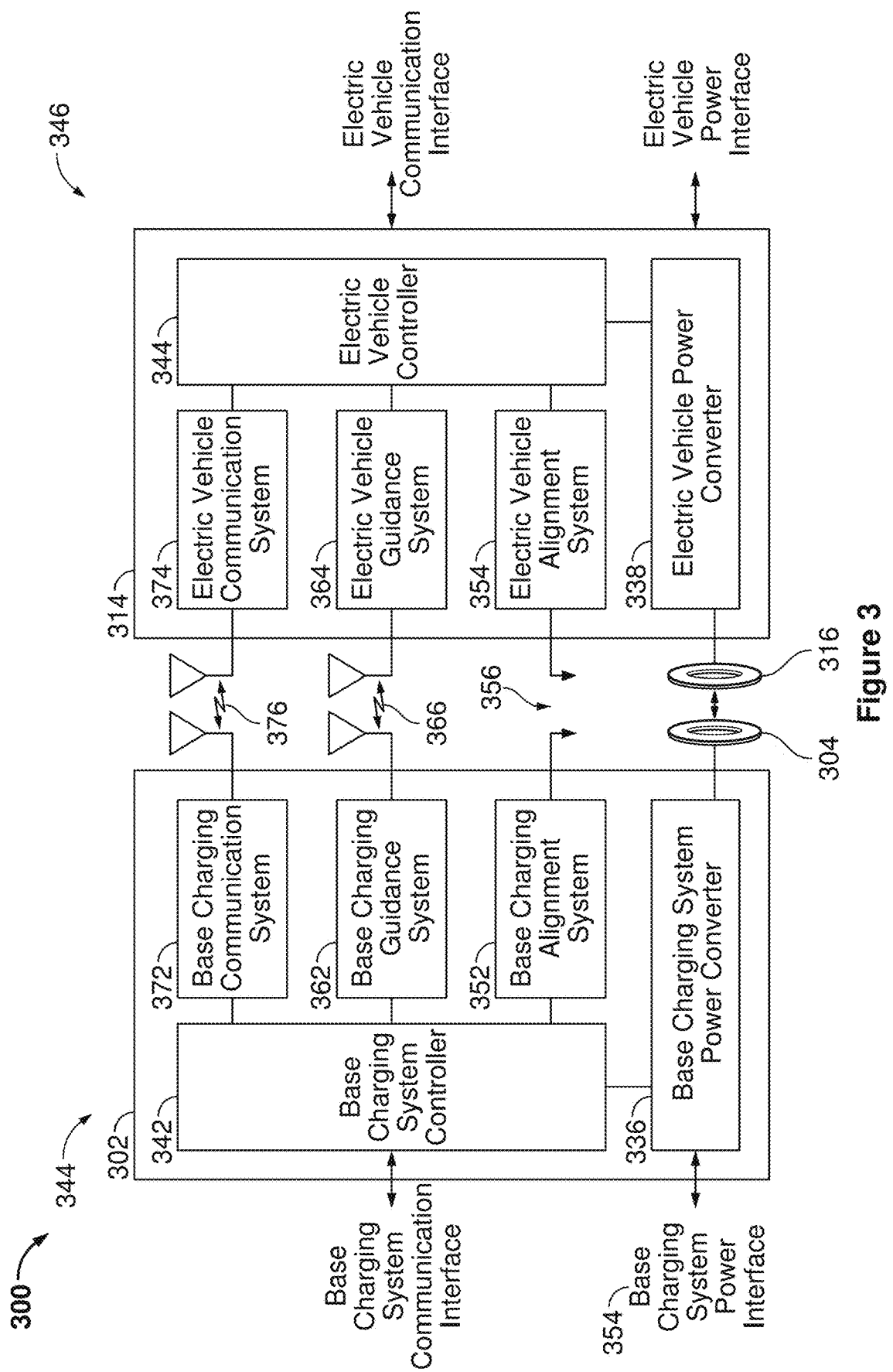
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a pre-defined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 20-150 kHz. This low frequency coupling may allow highly efficient power conversion that may be achieved using solid state devices. In addition, there may be less coexistence issues with radio systems compared to other bands.

With respect to induction charging, depending on the energy transfer rate (power level), operating frequency, size and design of the primary and secondary magnetic structures and the distance between them, the flux density in the air gap at some locations may exceed 0.5 mT and may reach several Millitesla. If an object that includes a certain amount of well conductive material (e.g., metal) is inserted into the space between the primary and secondary structures, eddy currents are generated in this object (Faraday's and Lenz's law), that may lead to power dissipation and subsequent heating effects. This induction heating effect depends on the magnetic flux density, the frequency of the alternating magnetic field, the size, shape, orientation and conductivity of the object's conducting structure. When the object is exposed to the magnetic field for a sufficiently long time, it may heat up to temperatures that may be considered hazardous in several regards. One hazard may be self-ignition if the object includes inflammable materials or if it is in direct contact with such materials, e.g., a cigarette package including a thin metalized foil. Another hazard may be burning the hand of a person that may pick-up such a hot object, e.g., a coin or a key. Another hazard may be damaging the plastic enclosure of the primary or secondary structure, e.g., an object melting into the plastic.

A temperature increase may be also expected in objects including ferromagnetic materials that may be substantially non-conducting but exhibiting a pronounced hysteresis effect or in materials that generate both hysteresis and eddy current losses. As such, detecting such objects is beneficial to avoid corresponding harmful consequences. If the object detection system is integrated within a system for providing wireless power, in response to detecting a harmful object, the system may reduce a power level or shut down until measures may be taken to remove the harmful object. Sensing objects based on their changing temperature inductively may be called "inductive thermal sensing."

In certain applications of inductive power transfer such as charging of electric vehicles in domestic and public zones, it may be compulsory for reasons of safety of persons and equipment to be able to detect foreign objects that have the potential to heat up to critical temperatures. This may be particularly true in systems where the critical space is open and accessible such that foreign objects may get accidentally or may be put intentionally into this space (e.g., in case of sabotage).

Embodiments described herein are directed to automatically detecting hazardous foreign objects (e.g., 'metal objects') that may be located in a pre-defined space. In particular, certain embodiments are directed to detecting small metal objects (e.g., a coin) located adjacent to a surface of the primary or secondary magnetic structure where magnetic flux density may exceed a particular value (e.g., 0.5 mT).

In accordance with certain embodiments, inductive thermal sensing may be useful for detecting a special category of metallic foreign objects in a predetermined 3-dimensional space. This special category may comprise objects that heat up relatively fast to hazardous temperatures if exposed to an alternating magnetic field as typically produced inside the critical space of a wireless power transfer system (e.g., wireless power transfer system 100, 200, and 300). Non-limiting examples of objects belonging to this category may be a cigarette packet including a metallized foil, the cover of a yoghurt cup, a chewing gum wrapper, and a cigarette lighter with a metallized lighter head. In some embodiments, the components and functions used by inductive thermal sensing may also apply to ordinary inductive sensing. Some aspects of inductive thermal sensing may be construed as an additive feature of an enhanced foreign object detector rather than a separate and additional apparatus.

Metal objects of the above defined category may heat up to temperatures e.g., above 500 Kelvin (K) if exposed to an alternating magnetic field with a flux density above 1 mT and with a frequency in the range from 20 to 150 kHz. Objects with temperatures above 500 K may be considered a potential risk for fire if the object comes into contact with a flammable material such as paper, dry foliage, oil, fuel, etc. Therefore, such objects must be considered a safety issue for wireless power transfer system generating flux density levels in the millitesla (mT) range in their functional space, if open and accessible.

In some embodiments, the presence an object (e.g. a metallic object) in a predetermined space can be detected inductively by using at least one loop of an electrical conductor (a sense loop or a sense coil, e.g., sense coil 402 or sense coil 702 as described below) and by measuring changes in a measurable characteristic e.g., an equivalent inductance, an equivalent resistance, or an impulse response of this at least one sense loop. The sense loop, sense coil, or foreign object detection (FOD) systems described herein may be integrated in a wireless power receiver (e.g., electric vehicle induction coil 116) or a wireless power transmitter (e.g., base wireless charging system 102a). In some embodiments, the FOD systems may also apply to non-integrated stand-alone (discrete) solutions. In some embodiments, the wireless power receiver or transmitter is a "circular" type coupler. This coupler type should be construed exemplary and integration solutions not limited thereto. This exemplary coupler is composed of a coil structure (e.g. made with a Copper Litz wire), a ferrite structure (e.g. soft ferrite material), and a conductive back plate (e.g. Aluminum). Descriptions and drawings herein assume a single foreign object for the sake of simplicity, however more than one foreign object may be detected within a predetermined space. An object (e.g. a metallic object) of sufficient size brought into proximity of a sense loop may alter the magnetic field strength, H, and flux density, B, as generated by this sense loop when driven with a current and thus it may also change at least one of the measurable characteristics of the sense loop. Therefore, in some aspects, the presence of an object may be detected by detecting a difference in at least one measured characteristic relative to the same characteristic as measured in absence of the object (reference measurement). The reference measurement may have been obtained in a process of calibrating a foreign object detection system.

However, for increased detection sensitivity requirements, this approach of detecting a difference in at least one measured characteristic may come to its limits. In some aspects, it may not be able to distinguish foreign objects from any other metallic or ferromagnetic structure located in the sensing range of the wireless power transfer system, since both may affect a sense loop's characteristics similarly. This may be particularly true, if the structure is moving or changing its electrical and magnetic properties so that its effect on a sense loop's characteristics is changing as well, and thus cannot be simply nullified in a calibration process.

In an electric vehicle charging application with a charging base wireless charging system 102a on the ground below the electric vehicle 112 and with at least one sense coil integrated into the base wireless charging system 102a, such metallic structures that may change the sense loop's characteristics may be the electric vehicle induction coil 116 or the vehicle's underbody. Additionally, electrically conductive or ferromagnetic structures in the base wireless charging system 102a may change the electrical parameters of a sense coil too. Changes may be due to, e.g., micro-movements caused by mechanical stress and/or changing temperature or due to changes of the electrical and/or magnetic material properties of these conductive or ferromagnetic structures, e.g., as a consequence of a changing temperature. Moreover, a sense coil itself may change its electrical parameters due to mechanical stress, temperature effects, or changes of the properties of the dielectric materials the sense coil is embedded in.

The effect of a changing environment may be of minor importance in a system designed for detecting metallic objects located near a surface (essentially in a two-dimensional space), but it may have a significant impact in a system designed for increased sensitivity, e.g., for detecting metal objects in an extended (three-dimensional) space.

Foreign objects of the above defined category may be detected by their temperature variation as occurring when exposed to a sufficiently strong alternating magnetic field. This may be particularly true if the object's temperature is stimulated by intermittently applying the magnetic field exposure in a manner so that object's temperature is following the exposure ON cycles and exposure OFF intervals distinctly.

Conductivity and permeability of most metals are generally a function of temperature $\vartheta$. Most metals show a fairly linear temperature behavior for their resistivity $\rho(\vartheta)$ with a linear temperature coefficient in the range from 0.003 to 0.006 l/K as shown in Table 1 below.

TABLE 1

| Metal/Alloy | Conductivity at 300 K $\delta$ [S/m] | Resistivity at 300 K $\rho$ [$\Omega$m] | Linear temp. coefficient $\alpha$ [1/K] | Relative permeability $\mu_r$ |
|---|---|---|---|---|
| Copper | 59 * 10$^6$ | 17 * 10$^{-9}$ | 0.0039 | 1 |
| Aluminum | 35 * 10$^6$ | 29 * 10$^{-9}$ | 0.0039 | 1 |
| Zinc | 16.9 * 10$^6$ | 59 * 10$^{-9}$ | 0.0037 | 1 |
| Nickel | 14.3 * 10$^6$ | 70 * 10$^{-9}$ | 0.006 | 100-600 |
| Iron | 10 * 10$^6$ | 100 * 10$^{-9}$ | 0.005 | 5000 |

TABLE 1-continued

| Metal/Alloy | Conductivity at 300 K $\delta$ [S/m] | Resistivity at 300 K $\rho$ [$\Omega$m] | Linear temp. coefficient $\alpha$ [1/K] | Relative permeability $\mu_r$ |
|---|---|---|---|---|
| Tin | 9.2 * 10$^6$ | 109 * 10$^{-9}$ | 0.0045 | 1 |
| Steel | 1.5 * 10$^6$ | 667 * 10$^{-9}$ | 0.003 | 1-1800 |
| Constantan | 2 * 10$^6$ | 500 * 10$^{-9}$ | 0.000008 | 1 |

There are a few exceptions, e.g., Constantan, a Nickel-Copper alloy that exhibits a very low temperature coefficient. The linear temperature model may be expressed as: $\rho(\vartheta)=\rho(\vartheta_0)(1+\alpha(\vartheta-\vartheta_0))$, where $\vartheta_0$ denotes the reference temperature, e.g., 300 K. Assuming validity of the linear law, a temperature increase of $\vartheta-\vartheta_0=100$ K will change electrical resistance of a metal with a temperature coefficient of 0.005 by 50%.

The permeability of a metal may exhibit a more complex behavior in general that cannot be approximated with a simple linear model. Since conductivity and permeability are those material properties that are responsible for changes of a sense coil's characteristics, a change of the object's temperature is also reflected in a change of a sense coil's characteristics, provided that the presence of the object exerts a measureable effect at all. Such changes may be potentially measured, e.g., with an analyzer circuit of reasonable complexity and cost, if: the presence of the object substantially affects a characteristics of at least one sense coil; an object's temperature changes significantly, e.g., at least over a range of 100 K; or the object's temperature changes faster (larger time gradient) than a temperature of the metallic environment when exposed to an alternating magnetic field.

Inductive thermal sensing can potentially provide a solution for an enhanced foreign object detection (FOD) circuit capable of detecting objects of the above defined category in a predetermined space that extends substantially in a third dimension. This category, as described above, may comprise metallic objects that dissipate considerable power per unit mass due to eddy currents when exposed to the magnetic field, have comparatively low thermal capacity so that they heat up faster than metallic structures in the environment when exposed to the magnetic field, or include metals with a temperature coefficient of an order of magnitude given by the numbers above (e.g., from 0.003 to 0.006), or would include ferromagnetic materials with a permeability that substantially varies with temperature.

Figure 4:
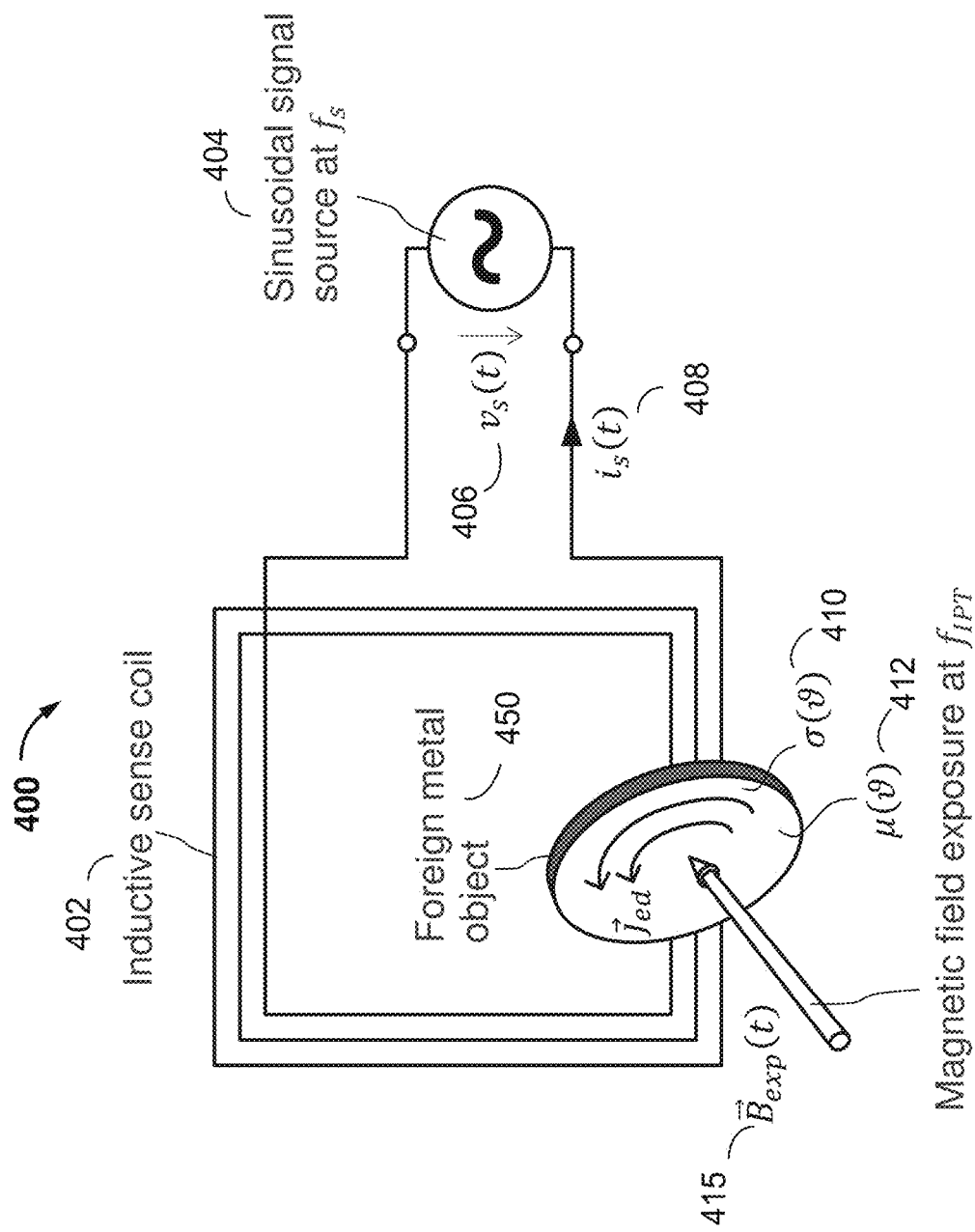
FIG. 4 is a diagram of an exemplary circuit for foreign object detection illustrating a principle of foreign object detection based on the object's temperature change using an inductive sense coil, in accordance with embodiments described herein.

FIG. 4 is a diagram of an exemplary circuit 400 for foreign object detection. The circuit 400 includes an inductive sense coil 402, which may comprise a coil of one or more loops and a foreign metallic object 450 exposed to a magnetic field $\vec{B}_{exp}(t)$ 415. The inductive sense coil 402 may be excited by a sinusoidal signal source 404 at a voltage $v_s(t)$ 406 and a sense frequency ($f_s$) resulting in a sense current $i_s(t)$ 408. The magnetic field $\vec{B}_p(t)$ 415 may be the magnetic field produced by the wireless power transfer system operating at inductive power transfer (IPT) frequency ($f_{IPT}$). The exposure field, magnetic field $\vec{B}_{exp}(t)$ 415, may be the field as generated by the base wireless charging system 102a (base pad) or by the electric vehicle induction coil 116 (vehicle pad) or it may be the sum of both fields e.g., as being the case during power transfer.

The alternating magnetic field $\vec{B}_{exp}(t)$ 415 at $f_{IPT}$ induces eddy currents into the metallic object 450 with electrical conductivity $\sigma(\vartheta)$ 410, which may cause a significant increase of its temperature. This induction heating effect may be stronger if the metallic object 450 is also ferromagnetic having a relative permeability $\mu_r(\vartheta)$ 412 larger than one, e.g., such as iron, steel, etc. Since skin depth δ of eddy currents that may be expressed as:

$$\delta = \sqrt{\frac{2}{2\pi f_{IPT}\, \sigma\, \mu_0\, \mu_r}}$$

decreases with increasing $\mu_r$, where $\mu_0$ is a permeability constant, thus resistance as experienced by eddy currents increases. Both material properties σ and $\mu_r$ may be generally a function of temperature ϑ, as shown by $\sigma(\vartheta)$ 410 and $\mu_r(\vartheta)$ 412.

Figure 5:
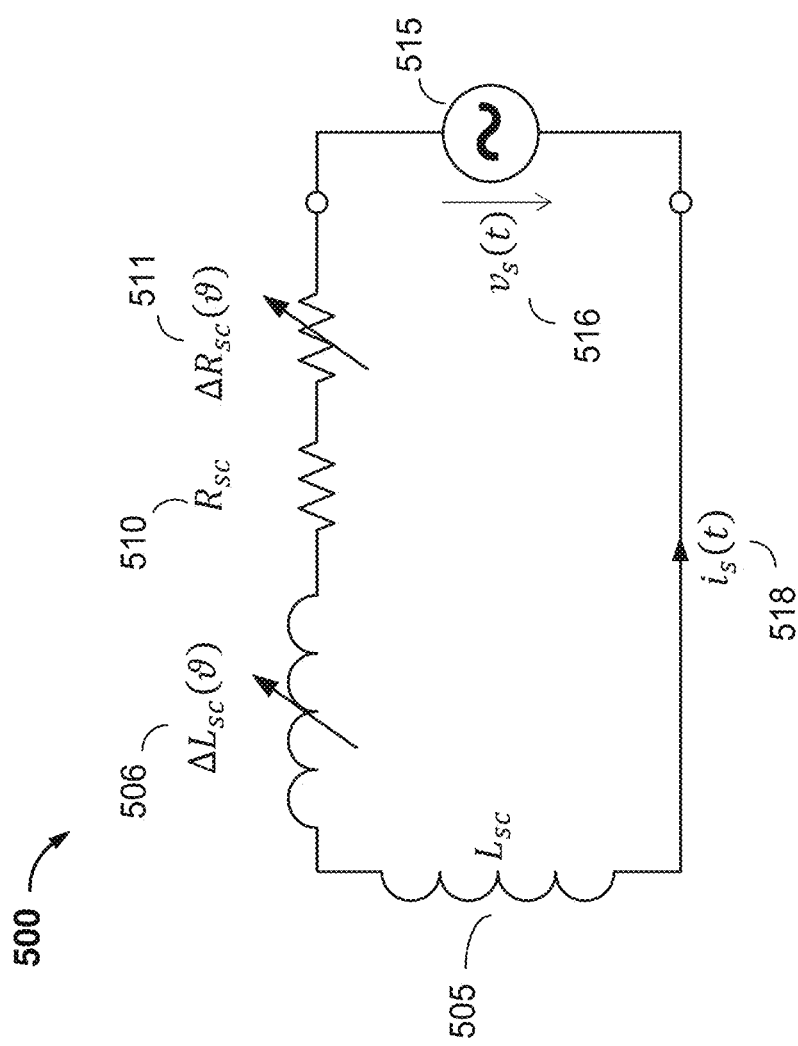
FIG. 5 is a diagram of an exemplary equivalent model of the inductive sense coil in presence of an object with a varying temperature.

FIG. 5 is a diagram of an exemplary equivalent series circuit 500 of a wireless power transfer system. The equivalent series circuit 500 may be applicable in the steady state of a sinusoidal excitation 515 with voltage 516 of a inductive sense coil (sense coil 402) at $f_s$. The equivalent series circuit 500 comprises a series inductance $L_{sc}$ 505 representing the system's overall energy storage effect and a series resistance $R_{sc}$ 510 representing the system's overall loss effects. The equivalent series circuit 500 also comprises series inductance $L_{sc}$ 505 and series resistance $R_{sc}$ 510 decomposed into nil-object inductance $L_{sc,0}$ and nil-object resistance $R_{sc,0}$ and into differential inductance $\Delta L_{sc}(\vartheta)$ 506 and differential resistance $\Delta R_{sc}(\vartheta)$ 511. The nil-object inductance $L_{sc,0}$ and nil-object resistance $R_{sc,0}$ mean inductance and resistance, respectively, in absence of a foreign object. The differential inductance $\Delta L_{sc}(\vartheta)$ 506 and differential resistance $\Delta R_{sc}(\vartheta)$ 511 represent the effect exerted by a metallic object in the influence zone of the sense coil. If at least one of an object's conductivity and permeability is a function of temperature ϑ, differential inductance $\Delta L_{sc}(\vartheta)$ 506 and differential resistance $\Delta R_{sc}(\vartheta)$ 511 will be generally also a function of the object's (e.g., foreign object 450) temperature ϑ.

Figure 6:
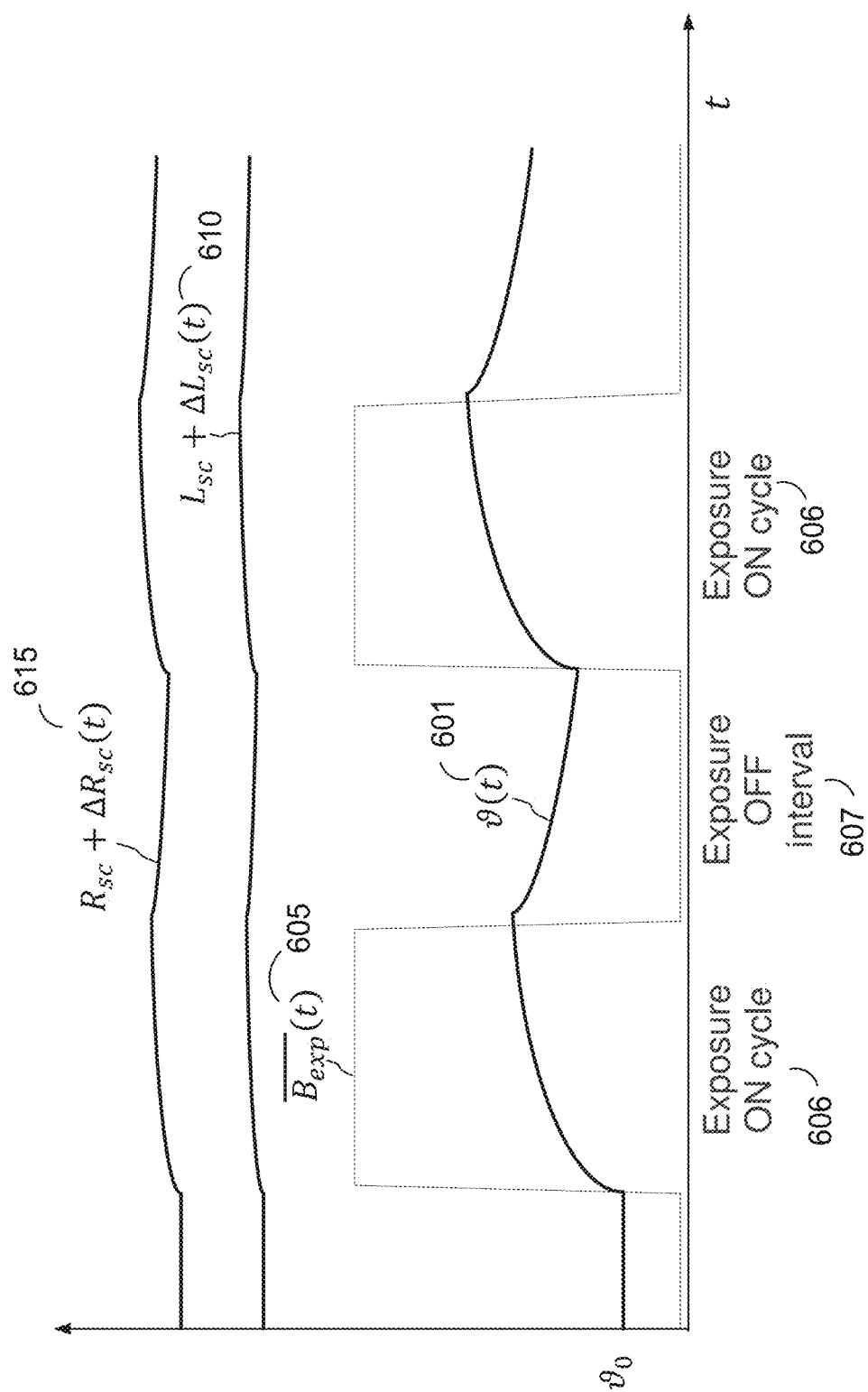
FIG. 6 is a time diagram illustrating a principle of foreign object detection based on stimulated eddy current heating of an object, in accordance with embodiments described herein, showing predicted time courses of different characteristics of a sense coil together with the magnetic field exposure cycles and resulting object's temperature.

FIG. 6 is a time diagram showing exposure cycles and various predicted time courses of object's temperature and sense coil's characteristics. As shown in FIG. 6, a foreign object (e.g., foreign object 450) is intermittently exposed to an alternating magnetic field. The detection method is based on "stimulated" inductive thermal sensing where at a minimum, stimulation may consist of at least one exposure ON cycle followed by an exposure OFF time. FIG. 6 also indicates typical exponential time variations of object's temperature response $\vartheta(t)$ 601 following the exposure time profile $\overline{B_{exp}}(t)$ 605, where $\overline{B_{exp}}(t)$ 605 denotes the envelope of the oscillating $\vec{B}_{exp}(t)$. As shown, the object's temperature response $\vartheta(t)$ 601 increases during the exposure ON cycle 606 and decreases during the exposure OFF interval 607. FIG. 6 also displays the resulting time variations of sense coil's equivalent inductance $L_{sc}+\Delta L_{sc}(t)$ 610 and resistance $R_{sc}+\Delta R_{sc}(t)$ 615. As shown, both the equivalent inductance $L_{sc}+\Delta L_{sc}(t)$ 610 and resistance $R_{sc}+\Delta R_{sc}(t)$ 615 increase during the exposure ON cycle 606 and decreases during the exposure OFF interval 607. These variations may reveal a foreign object of potential interest and may be used as a distinct signature to distinguish such objects from other metallic structure in the sensor's environment.

For example, in an exemplary embodiment, at least one of a sense coil 402's characteristics e.g., an equivalent resistance $R_{sc}+\Delta R_{sc}(t)$ 615 is measured constantly and recorded over a time period of at least a fraction of an exposure cycle (e.g., ON cycle 606 and OFF interval 607) including the start. To determine presence of a foreign metal object 450, in one embodiment, the at least one recorded time course of resistance $R_{sc}+\Delta R_{sc}(t)$ 615 is compared with the exposure time profile $\overline{B_{exp}}(t)$ 605 to find any coincidence or coherency that may be quantified using an appropriate metric. In another exemplary embodiment, this comparison is a correlation. The recorded time course of resistance $R_{sc}+\Delta R_{sc}(t)$ 615 or other sense coil 402 characteristic is correlated with the exposure time profile $\overline{B_{exp}}(t)$ 605. In a further exemplary embodiment, correlation is performed with at least one of a time-derivative, e.g., the first derivative $d/d_t$ (the time gradient) of the recorded time course of at least one of a sense coil 402's characteristics.

In some embodiments, assuming the validity of a first order temperature model with exponential decrease/increase of temperature, a time constant of an increase/decrease of one of a sense coil 402's characteristics (e.g., equivalent resistance $R_{sc}+\Delta R_{sc}(t)$ 615) may be a further characteristic useful to distinguish the foreign metal object 450 from metallic structure in the sense coil 402's environment. In one aspect, the at least one of a sense coil 402's characteristics e.g., equivalent resistance $R_{sc}+\Delta R_{sc}(t)$ 615) is measured constantly and recorded over a time period of at least a fraction of an exposure cycle including its start. For detecting a foreign metal object (e.g., foreign metallic object 450), the wireless power transfer system may estimate the time constant of the equivalent resistance, assuming an exponential law and compare the estimate to the measured value and determine if the difference is within an acceptable threshold.

In some embodiments, a quantity that may be considered representative for the sense coil 402's equivalent inductance may be measured by determining a frequency $f_s$ that is substantially at the resonant frequency of a resonant circuit formed by the sense coil 402 and a capacitor. This frequency may be defined as the frequency where the argument (phase angle) $\varphi_s = \arg(\underline{Z}_s)$ of an impedance $\underline{Z}_s$ of the resonant circuit as "seen" at the measurement port meets a set value $\varphi_{ref}$ with some tolerance $\Delta\varphi_{tol}$. The set value may preferably be chosen in the range from −30° to +30°. A quantity that may be considered representative for the sense coil 402's equivalent resistance may be determined by computing the magnitude (absolute value) $|\underline{Z}_s|$ of the impedance as measured at the frequency $f_s$.

Measuring above quantities may require appropriate filtering and/or averaging to suppress noise and other linear or non-linear disturbing effects. The choice of a suitable resonant frequency (sense frequency) for a sense circuit comprising the sense coil 402 may require particular attention. The fundamental and harmonics noise of an IPT system may potentially degrade sensitivity of an FOD system requiring adequate filtering of measured signals in order to achieve a desired sensitivity. In some embodiments, a sense frequency well above $f_{IPT}$, e.g., above 1 MHz, may be desirable. For a FOD system whose primary purpose is detecting metal objects (e.g., foreign metal object 450), the sense frequency should not be chosen too high, e.g., above 10 MHz, otherwise sense coils 402 may get also sensitive to electric fields (capacitive sensing) and thus to non-metallic dielectric objects (e.g. water, snow, ice).

Figure 7:
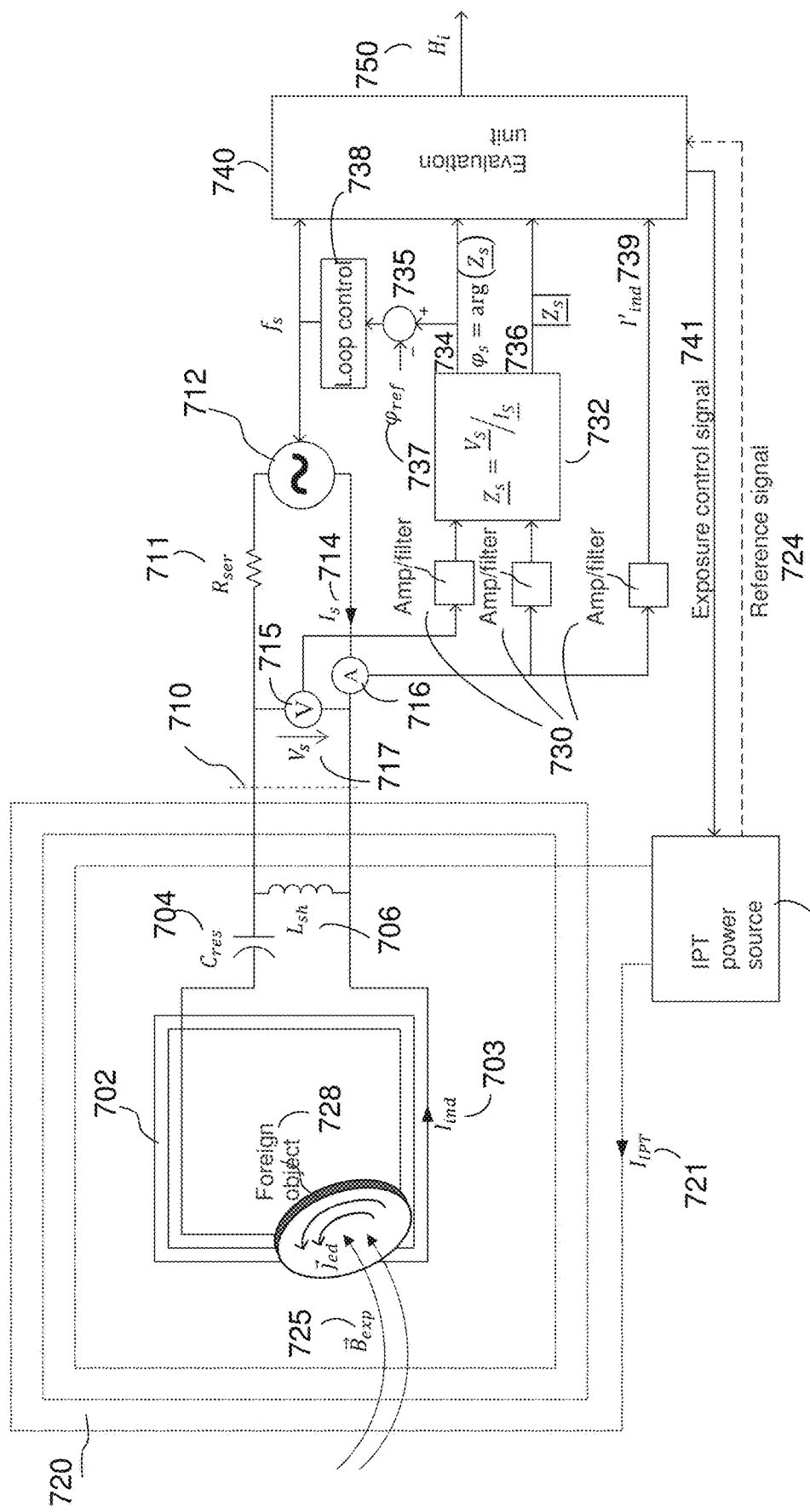
FIG. 7 is a schematic view of a foreign object detection (FOD) system in accordance with an exemplary embodiment.

FIG. 7 is a schematic view of a foreign object detection (FOD) system 700 in accordance with an exemplary embodiment. In this embodiment, the foreign object detection system 700 is part of and reuses parts of the IPT system e.g., IPT power source 722 which generates a current $I_{IPT}$ 721 for subjecting a foreign object 728 to an alternating magnetic field $\vec{B}_{exp}$ 725. The foreign object detection system 700 comprises a sense coil 702 that is series tuned by capacitor $C_{res}$ 704 with respect to a measurement port 710 and for a resonant frequency preferably in the range from 1 MHz to 10 MHz. Foreign object detection system 700 also comprises a shunt inductor $L_{sh}$ 706 which serves to reduce the voltage induced at $f_{IPT}$ e.g., below 150 kHz, preventing high disturbance voltages at the measurement port 710. The inductance of shunt inductor $L_{sh}$ 706 may be chosen as low as needed to suppress the induced voltage at $f_{IPT}$ but high enough so that only a negligible amount of sense current at $f_s$ is bypassed by the shunt inductor $L_{sh}$ 706.

To generate the sense signal as required to measure an impedance $\underline{Z}_s(f)$, the FOD system 700 uses a sinusoidal signal oscillator 712 providing an input for controlling the oscillator frequency, $f_s$. The oscillator 712 may act substantially as a voltage source that is connected to the measurement port 710 via series resistance $R_{ser}$ 711. This configuration may limit the sense current $I_s$ 714 when operating at or near resonant frequency where measurement port 710 impedance may become very low. Sense voltage 717 and sense current 714 as needed for determining $|\underline{Z}_s|$ and $\varphi_s=\arg(\underline{Z}_s)$ are measured by a voltage transducer 715 and current transducer 716, respectively, with minimum impact on the sense coil 702's equivalent inductance and resistance. Each is providing at its output a signal that is representative of the amplitude and phase of the sense voltage $V_s$ 717 and sense current $I_s$ 714, respectively.

Voltage transducer 715 and current transducer 716 outputs are both filtered at filters 730 to additionally suppress residual low frequency components and harmonic noise to provide signals as clean as needed to impedance calculator 732 for computing the impedance $\underline{Z}_s$ by computing the quotient $\overline{V}_s/\overline{I}_s$ with a required resolution. An output phase $\varphi_s$ 734 is then used by a phase comparator 735 that compares the output phase $\varphi_s$ 734 to a reference phase $\varphi_{ref}$ 737 and outputs the difference $\varphi_s-\varphi_{ref}$ to a loop control 738, which is the control loop error required by loop control 738 to adjust the oscillator 712's frequency. When the loop has settled at frequency $f_s$, the control loop error should be within a tolerance $|\varphi_s-\varphi_{ref}|<\Delta\varphi_{tol}$.

The loop control 738 output of the frequency $f_s$ is also sent to an evaluation unit 740 which may be used to determine the presence of the foreign object 728. The absolute value of the impedance $|\underline{Z}_s|$ and the output phase $\varphi_s$ 734 are sent to the evaluation unit 740. The evaluation unit 740 determines presence of an object by evaluating time series (sequences) of periodically measured quantities $f_s$, $|\underline{Z}_s|$, $\varphi_s$, etc., for example, by correlating time sequences of $f_s$ or $|\underline{Z}_s|$ with the exposure time function and by finally deciding on a detection hypothesis $H_i$ 750.

Temperature variations of the foreign object 728 may also manifest in faint changes of the phase $\varphi_s$ 734 smaller than $\Delta\varphi_{tol}$ thus may not be compensated for by the frequency control loop 738. In another exemplary embodiment, the evaluation unit 740 additionally may use time sequences of measured $\varphi_s$ 734 for determining presence of a foreign object 728.

In yet another exemplary embodiment, the evaluation unit 740 may control magnetic field exposure by assuming control over the IPT power source 722 and sending an exposure control signal 741. In some aspects, the evaluation unit 740 also receives and uses feedback indicative for the exact timing and strength of the exposure cycles as sensed by the at least one sense coil 702. This feedback is accomplished via signal $I'_{ind}$ 739 that is representative for a current $I_{ind}$ 703 that is induced into the sense coil 702 at $f_{IPT}$. In some aspects, $L_{sh}$ 706 may not fully bypass current $I_{ind}$ 703, so that a small but measurable portion of $I_{ind}$ 703 is flowing through the current transducer 716. The signal $I'_{ind}$ 739 may be also used to synchronize measurements of samples $f_s$, $|\underline{Z}_s|$ 1736 and $\varphi_s$ 734 with the low frequency magnetic field 725 as generated by the IPT system and to take advantage of time phases where there is less noise or less disturbance voltage/current.

The evaluation unit 740 may also receive a reference signal 724 that is provided by the IPT power source 722. This reference signal 724 may provide information about magnitude, phase, and frequency of the IPT power signal as delivered e.g., to a IPT coil 720. In conjunction with $I'_{ind}$ 739, this reference signal 724 may be useful for detecting presence of the foreign object 728, since foreign metal objects may generally also alter magnitude and phase of the magnetic field in the surrounding of the object. However, it may also be used for synchronization purposes as with the signal $I'_{ind}$ 739. To cover an area much larger than the size of the smallest objects to be detected, the FOD system 700 may require a plurality e.g., a regular array of sense coils 702, in order to provide the desirable sensitivity. The quantities $f_s$, $|\underline{Z}_s|$ and $\varphi_s$ may then be measured for each sense coil 702 individually. To form a two-dimensional regular array, sense coils 702 of equal size may be arranged in rows and columns. Sense coils 702 may be overlapping or non-overlapping.

Using a plurality of sense coils 702 tuned to the same or similar resonant frequency may require time multiplexing of the measurements of $f_s$, $|\underline{Z}_s|$ and $\varphi_s$, meaning that for reasons of mutual interference only one sense coil 702 can be active (current driven) at a time. Additionally, sense coils 702 of an array may be coupled to some degree. This is particularly true for neighboring sense coils 702 and if the array is integrated into an IPT coupler (base wireless charging system 102a) having a large ferrite structure conducting magnetic flux also at the sense frequency. In some aspects, mutual interference may be diminished by tuning all sense coils 702 or groups of sense coils 702 to substantially different resonant frequencies. By doing so, concurrent use (frequency multiplexing) of at least two sense coils 702 of an array may be possible.

Implementations based on a common resonant frequency may require a multiplexer (switch), as described further with respect to FIGS. 8A-8F, that disconnects sense coils 702 not in use from a measurement circuit comprising the measurement port 710. Multiplexing/switching may be performed at different stages in the sense circuits as will be shown and discussed below.

In some aspects, the sense coil 702's reactance compensation (tuning) topology may provide certain benefits. The exemplary embodiment shown in FIG. 7 is based on series tuning. Series tuning may be more suitable for multiplexing/switching than parallel tuning as switching/multiplexing may be performed after capacitor $C_{res}$ 704 and shunt inductor $L_{sh}$ 706 resulting in lower voltage requirements for the multiplexer switches. In some aspects, $C_{res}$ 704 and $L_{sh}$ 706 form a voltage divider for the induced voltage at IPT frequency. Therefore, the series topology may be seen particularly advantageous e.g. for the use of analogue switches with limited voltage range (e.g. FET switches). Furthermore, series resonant circuits disconnected from the sense signal source 712 will be completely detuned thus may not negatively impact a sense circuit in use. Moreover, any sense circuit not in use but resonating substantially at the frequency of a sense circuit in use may act as a parasitic resonance absorbing energy from that sense circuit in use, thus degrading its innate sensitivity.

However, parallel tuning may be used as well if switching/multiplexing is performed before the parallel capacitor e.g., directly at sense coil 702's terminals, requiring switches/multiplexers with higher voltage ratings or if sense coils 702 are tuned to different resonant frequencies as explained above.

Figure 8E:
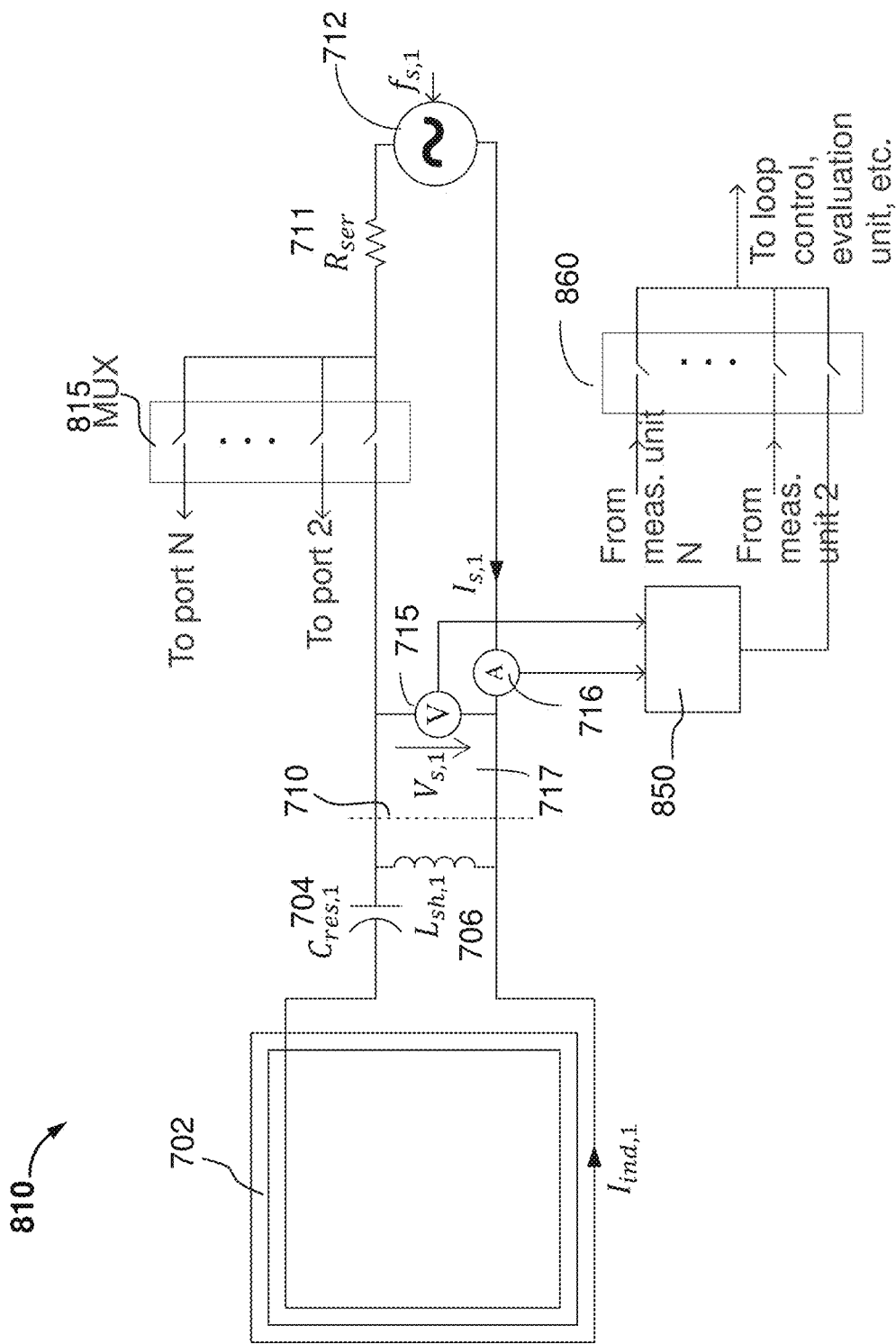
FIG. 8E is a diagram of a sense circuit in a series tuned configuration using a multiplexer switch inserted between a plurality of voltage/current transducers and a common signal source.

The schematic views of FIG. 8A to FIG. 8F illustrate different multiplexing and tuning configurations for FOD systems in accordance with exemplary embodiments based on a plurality of sense coils. FIG. 8A is a diagram of a sense circuit 800 that refers to series tuning and shows multiplexer 805 between sense loop 702 and capacitor $C_{res}$ 704. In this configuration, the measurement circuit, including current transducer 716 and sense signal source 712, is common to a number N of sense coils 702 resulting in low overall circuit complexity. However, this configuration may place high requirements on the switches of multiplexer 805 in terms of voltage rating and insertion resistance. To preserve sense coil 702's innate sensitivity, the latter ideally should not exceed e.g., one fourth of the sense coil 702's equivalent series resistance.

The same multiplexing configuration but for parallel tuning is shown in the diagram of FIG. 8B. This configuration results in similar complexity and is equally demanding in regards to the multiplexer 805's voltage rating and insertion resistance. As opposed to series resonance where measurements are performed at a sense voltage minimum and sense current maximum, parallel resonance requires measurements to be performed at voltage maximum and current minimum.

FIG. 8C is a diagram of a sense circuit 802 that illustrates series tuning and shows multiplexer 806 positioned after capacitor $C_{res,1}$ 704 and inductor $L_{sh,1}$ 706. This configuration may exhibit increased complexity as $C_{res,1}$ 704 and inductor $L_{sh,1}$ 706 are now individual for each sense coil 702. It is equally demanding in regards to the multiplexer 806's insertion resistance but may place much lower requirements on its voltage rating.

FIG. 8D is a diagram of a sense circuit 803 with the same multiplexing configuration as FIG. 8C but for parallel tuning. This configuration results in similar complexity and it may place similar requirements on the multiplexer 806's voltage rating but may be less demanding in regards to its insertion resistance since the resonant current is no longer passing through the switch. One drawback may be the need for tuning the sense circuits 803 to substantially different resonant frequencies as explained above. Depending on the number N of sense coils 702, a relatively wide frequency band may be required with an upper edge frequency that may conflict with the requirement of a low sensitivity on electric fields.

FIG. 8E is a diagram of a sense circuit 810 illustrating a multiplexer 815 between voltage/current transducers 715/716 and the signal source 712 in a series tuning configuration. In this configuration, a measurement unit 850 receives the outputs from the voltage transducer 715 and current transducer 716 and the measurement unit 850's output is sent to multiplexer 860 where it is multiplexed with the outputs from the other N measuring units 850. The multiplexer 860 then sends its output to a loop control (e.g., loop control 738), evaluation unit (e.g., evaluation unit 740), etc. In some embodiments, tuning, shunting, and measurement units 850, except the signal source 712, may be individual to each sense coil 702 and may result in relatively high overall circuit complexity. However, this configuration may place lower requirements on the multiplexers 815 and 860 voltage rating and insertion resistance.

Figure 8F:
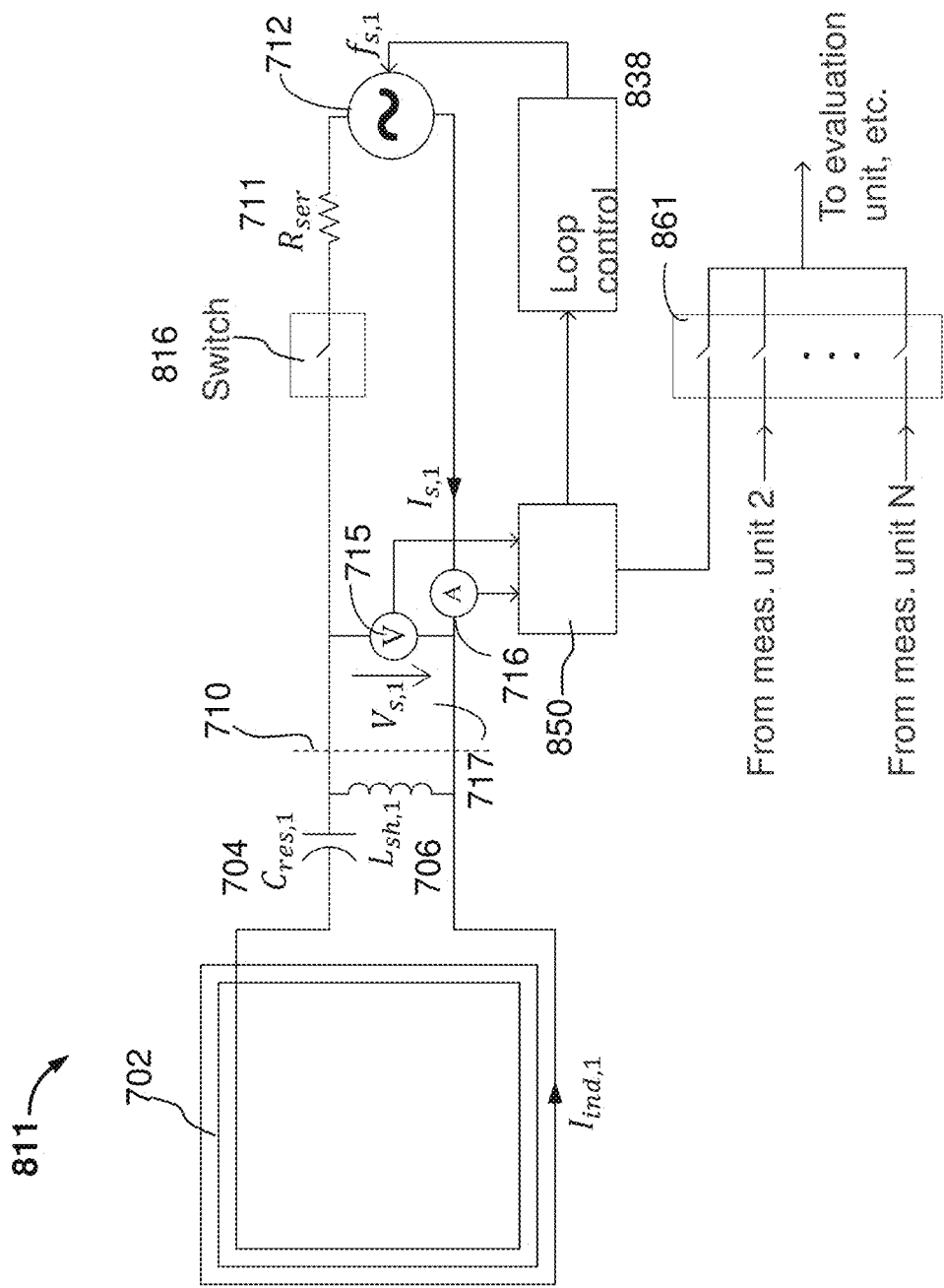
FIG. 8F is a diagram of a sense circuit in series tuned configuration using a multiplexer switch inserted between a plurality of measurement units and a common evaluation unit.

FIG. 8F is a diagram of a sense circuit 811 illustrating a loop control 838 between the measurement unit 850 and the signal source 712. In this embodiment, the complete sense circuit 811 is on a per sense coil 702 basis and there is no multiplexing in the sense circuit 811 at all. However, the outputs of the measurement units 850 may require physical or logical multiplexing (e.g., multiplexer 861) which are then sent to an evaluation unit or other circuitry. A low performance switch 816 may still be needed to disconnect the sense coil 702 from the signal source 712 to ensure that unused sense circuits 811 do not negatively impact sense circuits 811 in use.

All above concepts and implementations in FIGS. 8A-8F use resonant sense circuits, a continuous wave sinusoidal signal source 712 and measure at least quantities $f_s$, $|Z_s|$ as considered representative for the sense coil 702's inductance and resistance and changes thereof. This measurement method may be also considered equivalent to measuring the complex resonant angular frequency $s_s = \sigma_s + j\omega_s$ of a dampened resonance, where the coefficient $\sigma_s$ is related to $|Z_s(\omega_s)|$ and $\omega_s = 2\pi f_s$.

However, the presence of the foreign object 728 can also be detected by analyzing the sense coil 702's characteristic impulse response. This basic method may also apply to inductive thermal sensing where foreign objects 728 are detected by their temperature variation. The presence of the foreign object 728 and thus changes of its temperature may modify the characteristic impulse response of at least one sense coil 702. This method may not need resonance tuning and may be accomplished using a sense coil 702 that is current charged across a DC voltage source for a short period of time.

Figure 9:
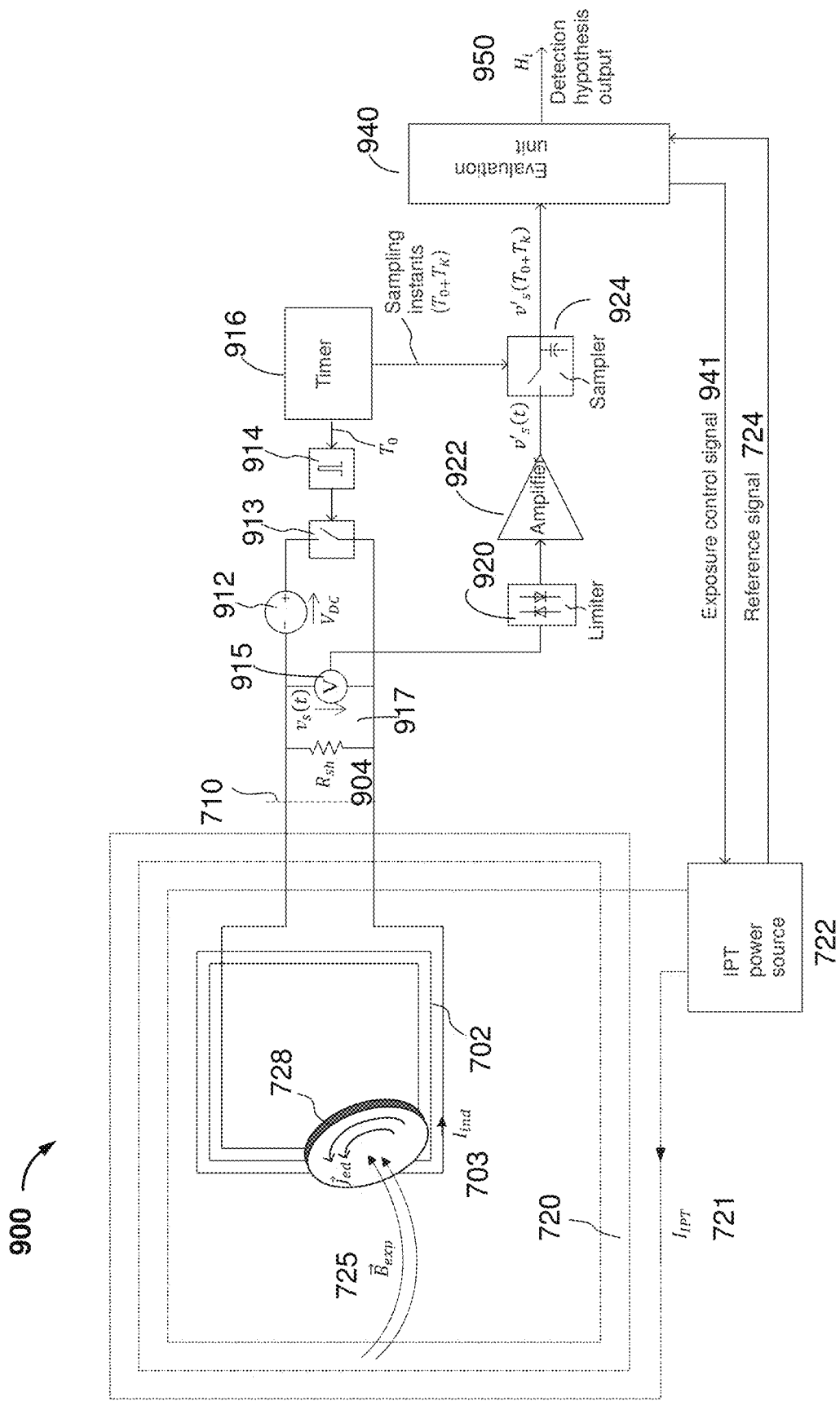
FIG. 9 is a schematic view of a foreign object detection system based on an impulse response method, according to an exemplary embodiment described herein.

FIG. 9 is a schematic view of a foreign metal object detection system 900 based on the impulse response method according to an exemplary embodiments described herein. The system comprises a timer circuit 916, a pulse generator 914 defining current charge time, a switch 913 executing the charging pulse, a DC voltage source $V_{DC}$ 912 for charging the sense coil 702, a voltage transducer 915 to measure the voltage $v_s(t)$ 917 across the sense coil 702 during the discharging period, a shunt resistance $R_{sh}$ 904 for discharging the sense coil 702 in a defined manner, a limiter 920 clipping the measurement signal at levels exceeding a range of interest and preventing a measurement amplifier 922 from saturation, and a sampler 924 for sampling the voltage response signal $v'_s(t)$ at defined time instants $T_0+T_k$, with index k=1 ... K, where K denotes the number of acquired samples per impulse response. In some embodiments, at a time $T_0$, the sense coil 702 is disconnected from DC voltage source 912 by a switch 913 and discharging across defined shunt resistance $R_{sh}$ 904 starts. The voltage $v_s(t)$ 917 as measured across the sense coil 702 may be clipped by limiter 920 at levels exceeding the range of interest and preventing a measurement amplifier 922 from saturation. The voltage response signal $v'_s(t)$ is then sampled by sampler 924 at least at one defined time instant $T_0+T_k$. The sampler 924 receives the sampling instants $T_0+T_k$ from the timer circuit 916. The at least one time sample $v'_s(T_0+T_k)$ is then sent to the evaluation unit 940 to determine a detection hypothesis $H_i$ 950.

In some embodiments, the presence of the metallic object 728 is determined by periodically applying the voltage pulse 914 to the sense coil 702 and by sampling at sampler 924 each impulse response $v'_s(t)$ at least at one defined time instant $T_0+T_k$, and by evaluating a time sequence of the at least one time sample $v'_s(T_0+T_k)$ by correlating a time sequence of the at least one time sample $v'_s(T_0+T_k)$ with the exposure time profile (e.g., $\underline{B}_{exp}(t)$ 605) by the evaluation unit 940 which finally also decides on a detection hypothesis $H_i$ 950.

In another exemplary embodiment, the system 900 adjusts voltage pulse 914 timing in accordance with the IPT frequency and measures impulse responses synchronously to the IPT frequency e.g., at times where noise as picked up by the sense coils 702 has its lowest level.

In some embodiments, extension of the impulse response method to a plurality (array) of sense coils 702 may not require an extra multiplexer in the sense circuits. The pulse switch 913 that may be individual for each sense circuit may assume the multiplexing function e.g., in that a pulse is applied to only one sense coil 702 at a time. The DC voltage source 912 may be common for a number of sense coils 702, whilst shunt resistance $R_{sh}$ 904 and voltage transducer 915 as well as limiter 920 may be also individual for each sense coil 702. Multiplexing of the sensed voltages may be performed after the limiter 920 or even after the signal is amplified by amplifier 922 e.g., as part of the sampler 924.

In some embodiments, FOD based on inductive thermal sensing may be applied initially before starting regular inductive power transfer e.g., for the purpose of charging an electric vehicle 112. If FOD determines presence of the foreign object 728, the system stops inductive thermal sensing and does not start regular inductive power transfer. During regular power transfer, the IPT system may employ at least one other detection method e.g., a method that is suitable for detecting an object that enters the critical space e.g., based on a time differential approach. This may be one of another inductive sensing method, a radar-based method, motion based method, and any other sensing method. In the event the FOD system trips, the FOD system may verify this detection by first ceasing regular power transfer and reapplying inductive thermal sensing using an intermittent magnetic field exposure. This may apply in case of a detection with low confidence. If the previous finding of a foreign object is confirmed, the IPT system discontinues regular inductive power transfer else it reactivates regular power transfer.

Depending on the system implementation, magnetic field exposure (e.g., magnetic field $\vec{B}_{exp}$ 725) as needed for the purpose of inductive thermal sensing may be generated by transferring real power to a load e.g., the battery of an electric vehicle 112, or it may be generated essentially by reactive power by driving at least one of a base pad (base wireless charging system 102a) and vehicle pad (electric vehicle induction coil 116) with a strong enough current. In some embodiments, the magnetic field exposure as needed for the purpose of inductive thermal sensing is generated by transferring real power to a load. In some aspects, inductive-thermal sensing may be applied more cautiously to prevent hazardous situations during exposure cycles. In some embodiments, magnetic field exposure may start at an uncritical level. If no abnormal behavior is detected, the FOD system may successively increase the level of magnetic field exposure from cycle to cycle.

For certain categories of objects and particularly for objects with larger thermal capacity (slowly heating objects), stimulated inductive thermal sensing as described above may not provide sufficient detection performance. Slowly heating objects may not be easily distinguishable from other disturbing temperature effects e.g. from metallic structure in the environment.

An exemplary FOD system for detecting slowly heating objects may compare recorded time sequences of at least one characteristic as obtained from a plurality of sense coils 702 for discriminating between foreign metallic objects 728 and metallic structures in the sensor's environment. If time courses of a majority of sense coils 702 show similar correlation with the exposure cycles, the system may conclude an environmental effect is occurring. However, if time courses of only a minority of sense coils 702 show pronounced correlation, the system may assume an effect from a potential foreign metallic object 728. This approach may be considered a space differential approach.

In some embodiments, a FOD system may use a plurality of sense coils 702 and compare a first correlation result obtained from a first sense coil 702 with at least one second correlation result obtained from at least one second sense coil 702. If the difference between the first correlation result and the at least one second correlation result exceeds a defined threshold, the system may conclude on the presence of a foreign metallic object 728.

In some aspects, metallic structures in the environment of a sense coil 702 e.g., the vehicle 112 underbody, may temporarily move. This may happen, for example, when a person enters or leaves the vehicle 112 or when the vehicle 112 is loaded or unloaded. These movements may disturb measurements that may need to be performed for stimulated inductive thermal sensing. Assuming an array of sense coils 702, these disturbances may be expected to occur on all or at least on a majority of sense coils 702. In some embodiments, the FOD system may discontinue stimulated inductive thermal sensing if disturbances are detected in a majority of sense coils 702.

Figure 10:
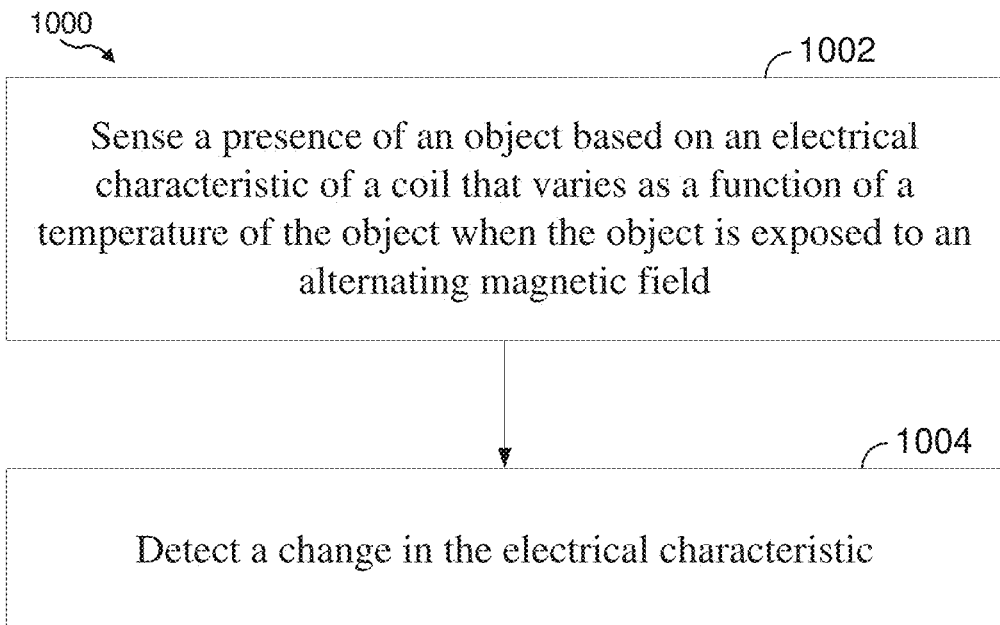
FIG. 10 is a flowchart of an exemplary method for detecting the presence of an object, in accordance with an exemplary embodiment.

FIG. 10 is a flow chart of an exemplary method 1000 for detecting a presence of an object, in accordance with certain embodiments described herein. Although the method 1000 is described herein with reference to the circuits and/or devices as discussed above with respect to FIGS. 4-9, a person having ordinary skill in the art will appreciate that the method 1000 may be implemented by other suitable devices and systems. Although the method 1000 is described herein with reference to a particular order, in various embodiments, blocks herein may be performed in a different order, or omitted, and additional blocks may be added.

Operation block 1002 includes sensing a presence of the object based on an electrical characteristic of the coil that varies as a function of a temperature of the object when the object is exposed to an alternating magnetic field. Operation block 1004 includes detecting a change in an electrical characteristic.

Figure 11:
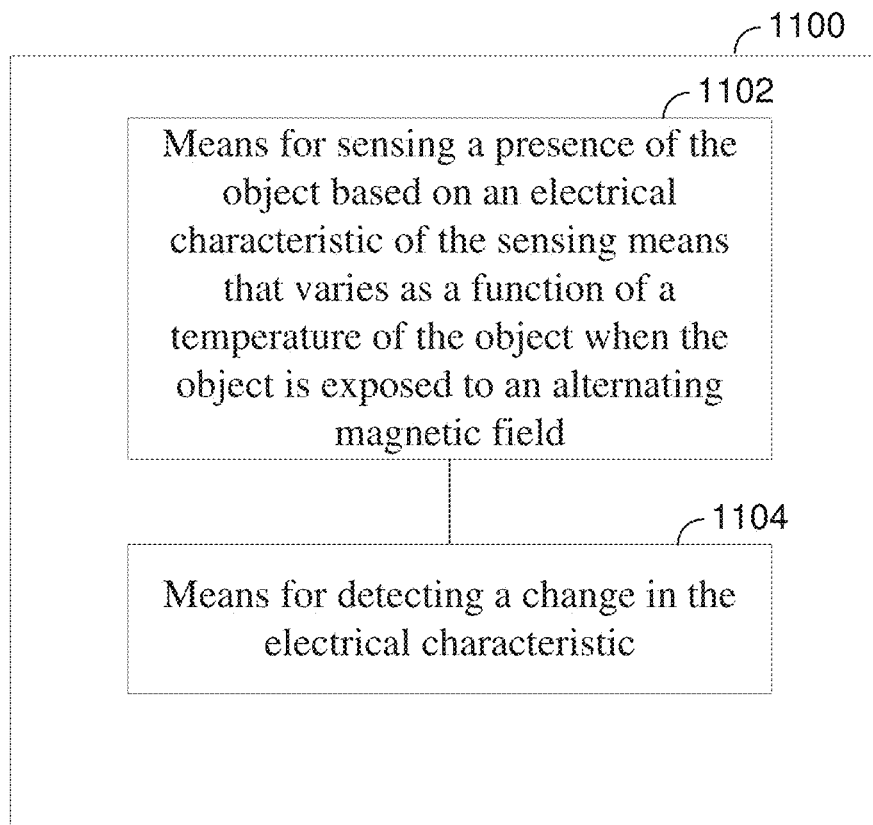
FIG. 11 is a functional block diagram of an apparatus for detecting the presence of an object, in accordance with an exemplary embodiment.

FIG. 11 is a functional block diagram of an apparatus 1100 apparatus for detecting an object, in accordance with certain embodiments described herein. Those skilled in the art will appreciate that the apparatus 1100 may have more components than the simplified block diagrams shown in FIG. 11. FIG. 11 includes only those components useful for describing some prominent features of implementations within the scope of the claims.

The apparatus 1100 comprises means 1102 for sensing a presence of the object based on an electrical characteristic of the coil that varies as a function of a temperature of the object when the object is exposed to an alternating magnetic field. In certain embodiments, the means 1102 for sensing can be implemented by the sense coil 702 (FIG. 7). In certain embodiments, the means 1102 for sensing can be configured to perform the functions of block 1002 (FIG. 10). The apparatus 1100 further comprises means 1104 for detecting a change in an electrical characteristic. In certain embodiments, the means 1104 for detecting can be implemented by the evaluation unit 740 (FIG. 7). In certain embodiments, the means 1104 for detecting can be configured to perform the functions of block 1002 (FIG. 10).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions should not be interpreted as causing a departure from the scope of the embodiments.

The various illustrative blocks, modules, and circuits described in connection with the embodiments disclosed herein may be implemented or performed with a general purpose hardware processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the embodiments disclosed herein may be embodied directly in hardware, in a software module executed by a hardware processor, or in a combination of the two. If implemented in software, the functions may be stored on or transmitted as one or more instructions or code on a tangible, non-transitory computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The hardware processor and the storage medium may reside in an ASIC. The ASIC may reside in a user terminal. In the alternative, the hardware processor and the storage medium may reside as discrete components in a user terminal.

For purposes of summarizing the disclosure, certain aspects, advantages and novel features s have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. An apparatus for detecting a presence of an object located in a power transfer area of a wireless power transmitter, the apparatus including:

a first inductive sense circuit and a second inductive sense circuit, each including a sense coil configured to inductively sense the presence of the object based on an electrical characteristic of the sense coil that varies as a function of a temperature of the object when the object is exposed to an alternating magnetic field generated by the wireless power transmitter in the power transfer area at an operating frequency of the wireless power transmitter, each of the first and second inductive sense circuits comprising a location for measuring the electrical characteristic and configured to reduce a disturbance voltage measured at the location; and a controller configured to:
 schedule an exposure cycle for the alternating magnetic field generated by the wireless power transmitter,
 transmit a signal to the wireless power transmitter to control the exposure cycle for the alternating magnetic field,
 measure the electrical characteristic of each sense coil over time based on measuring at least one of a voltage and a current signal at the location of each of the first and second inductive sense circuits,
 suppress effects of the disturbance voltage at fundamental and harmonic frequencies of the wireless power transmitter by filtering to achieve a target detection sensitivity of the apparatus,
 determine a first correlation result between the measured electrical characteristic and the exposure cycle for the first sense circuit based on comparing the measured electrical characteristic with the exposure cycle over at least a portion of a duration of the exposure cycle and determine a second correlation result between the measured electrical characteristic and the exposure cycle for the second sense circuit based on comparing the measured electrical characteristic with the exposure cycle over at least a portion of a duration of the exposure cycle, and determine the presence of the object based on a comparison of the first correlation result with the second correlation result.

2. The apparatus of claim 1, wherein each measured electrical characteristic comprises one or more of a current, a voltage, an equivalent resistance, equivalent inductance, a resonant frequency, a complex resonant frequency, a dampening factor, a Q-factor, an impedance, or a phase when the inductive sense circuit is driven by a sinusoidal signal source.

3. The apparatus of claim 1, wherein each measured electrical characteristic comprises an impulse response of the corresponding inductive sense circuit when the inductive sense circuit is driven by a pulse signal source, or a response of the corresponding inductive sense circuit when the inductive sense circuit is driven by any of a voltage or current time function.

4. The apparatus of claim 1, wherein the first and second inductive sense circuits each comprise a plurality of inductive sense circuits, each comprising a respective sense coil and a respective location.

5. The apparatus of claim 4, wherein the controller is further configured to multiplex measurements of the measured electrical characteristic of the respective sense coils, to compare each of a plurality of measured electrical characteristics with the exposure cycle to determine a plurality of first and second correlation results between the measured electrical characteristic and the exposure cycle for each of the respective first and second sense circuits.

6. The apparatus of claim 5, wherein the controller is further configured to determine the presence of the object based on the first correlation results and at least one of the second correlation results.

7. The apparatus of claim 1, wherein the controller is further configured to determine the presence of the object when a difference between the first correlation result and the second correlation result exceeds a threshold.

8. The apparatus of claim 1, wherein the controller is further configured to compare a derivative of each electrical characteristic over at least a portion of time of the exposure cycle with the exposure cycle over the same period of time.

9. The apparatus of claim 1, wherein the controller is further configured to receive a feedback signal from the wireless power transmitter generating the alternating magnetic field indicating at least one of a timing schedule for the exposure cycle and electrical characteristics of a power signal used to generate the alternating magnetic field during the exposure cycle.

10. The apparatus of claim 1, wherein the first and second inductive sense circuits and the controller are positioned within the wireless power transmitter.

11. The apparatus of claim 1, wherein the controller is further configured to control the wireless power transmitter to start with an uncritical magnetic field level in an initial exposure cycle and to successively increase the level of the alternating magnetic field in following exposure cycles if no object is detected.

12. The apparatus of claim 1, wherein the disturbance effects suppressed by the filtering comprise linear disturbance effects.

13. A method for detecting a presence of an object located in a power transfer area of a wireless power transmitter, comprising:
sensing the presence of the object based on an electrical characteristic of a sense coil of first and second sense circuits that varies as a function of a temperature of the object when the object is exposed to an alternating magnetic field generated by the wireless power transmitter in the power transfer area at an operating frequency of the wireless power transmitter;
reducing a disturbance voltage measured at a location for measuring the electrical characteristic of the respective sense circuit at the operating frequency of the wireless power transmitter;
scheduling an exposure cycle for the alternating magnetic field;
transmitting a signal to the wireless power transmitter to control the exposure cycle for the alternating magnetic field;
generating the alternating magnetic field based upon the exposure cycle;
measuring the electrical characteristic of each sense coil over time based on measuring at least one of a voltage and a current signal at the location of each of the first and second inductive sense circuits;
suppressing effects of the disturbance voltage at fundamental and harmonic frequencies of the wireless power transmitter by filtering to achieve a target detection sensitivity;
determining a first correlation result between the measured electrical characteristic and the exposure cycle for the first sense circuit based on comparing the measured electrical characteristic with the exposure cycle over at least a portion of a duration of the exposure cycle and determining a second correlation result between the measured electrical characteristic and the exposure cycle for the second sense circuit based on comparing the measured electrical characteristic with the exposure cycle over at least a portion of a duration of the exposure cycle, and
determining the presence of the object based on a comparison of the first correlation result with the second correlation result.

14. The method of claim 13, wherein each measured electrical characteristic comprises one or more of a current, a voltage, an equivalent resistance, equivalent inductance, a resonant frequency, a complex resonant frequency, a dampening factor, a Q-factor, an impedance, or a phase when the inductive sense circuit is driven by a sinusoidal signal source.

15. The method of claim 13, wherein each measured electrical characteristic comprises an impulse response of the corresponding inductive sense circuit when the inductive sense circuit is driven by a pulse signal source, or a response of the corresponding inductive sense circuit when the inductive sense circuit is driven by any of a voltage or current time function.

16. The method of claim 13, wherein measuring an electrical characteristic of each sense coil comprises measuring the electrical characteristic based on measuring at least one of a voltage and a current signal at the location of each of a plurality of first and second sense circuits and multiplexing measurements of the electrical characteristic of each sense coil.

17. The method of claim 13, wherein filtering comprises suppressing linear disturbance effects.

18. The method of claim 16, wherein comparing the measured electrical characteristics over time with the exposure cycle comprises determining a plurality of first and second correlation results between the measured electrical characteristic and the exposure cycle for each of the respective first and second sense circuits.

19. The method of claim 18, wherein determining the presence of the object comprises determining the presence of the object based on the first correlation results and at least one of the second correlation results.

20. The method of claim 13, wherein determining the presence of the object comprises determining the presence of the object when a difference between the first and second correlation result exceeds a threshold.

21. The method of claim 13, wherein comparing each measured electrical characteristic with the exposure cycle comprises comparing a derivative of each electrical characteristic over at least a portion of time of the exposure cycle with the exposure cycle over the same period of time.

22. The method of claim 13, further comprising receiving a feedback signal from the wireless power transmitter generating the exposure magnetic field indicating electrical characteristics of a power signal used to generate the exposure magnetic field during the exposure cycle.

23. The method of claim 13, further comprising controlling the wireless power transmitter to start with an uncritical magnetic field level in an initial exposure cycle and to successively increase the level of the alternating magnetic field in following exposure cycles if no object is detected.

* * * * *